(12) United States Patent
Hoshi et al.

(10) Patent No.: US 11,279,272 B2
(45) Date of Patent: Mar. 22, 2022

(54) VEHICLE SEAT

(71) Applicant: TS TECH CO., LTD., Asaka (JP)

(72) Inventors: Yuichiro Hoshi, Tochigi (JP); Kazuki Kobayashi, Tochigi (JP); Tomohisa Tanaka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/490,433

(22) PCT Filed: Sep. 13, 2017

(86) PCT No.: PCT/JP2017/032978
§ 371 (c)(1),
(2) Date: Aug. 30, 2019

(87) PCT Pub. No.: WO2018/158987
PCT Pub. Date: Sep. 7, 2018

(65) Prior Publication Data
US 2020/0361350 A1    Nov. 19, 2020

(30) Foreign Application Priority Data

Mar. 1, 2017   (JP) .............................. JP2017-038664
Mar. 1, 2017   (JP) .............................. JP2017-038673
(Continued)

(51) Int. Cl.
*B60N 2/56*    (2006.01)
*B60N 2/20*    (2006.01)
(Continued)

(52) U.S. Cl.
CPC ............. *B60N 2/5657* (2013.01); *B60N 2/20* (2013.01); *B60N 2/64* (2013.01); *B60N 2/68* (2013.01)

(58) Field of Classification Search
CPC .. B60N 2/5621; B60N 2/5657; B60N 2/5635; B60N 2/5628; B60N 2/5642; B60N 2/56;
(Continued)

(56) References Cited

U.S. PATENT DOCUMENTS 3,198,578 A * 8/1965 Hoppe ................. B60N 2/7041
297/452.57
5,924,766 A * 7/1999 Esaki ....................... A47C 7/74
297/180.13
(Continued)

FOREIGN PATENT DOCUMENTS

CN        103025571      4/2013
EP         1203690       5/2002
(Continued)

OTHER PUBLICATIONS

Office Action issued for Japanese Patent Application No. 2017-038664, dated Jun. 2, 2020, 6 pages including English translation.
(Continued)

*Primary Examiner* — Kyle J. Walraed-Sullivan
(74) *Attorney, Agent, or Firm* — Hamre, Schumann, Mueller & Larson, P.C.

(57) ABSTRACT

Provided is vehicle seat with a seat cushion and a seat back, the vehicle seat comprising: a pair of cushion side frames; a duct extending from the seat cushion along a rear side of a cushion frame toward the seat back and connecting an air passage and a blower, the air passage being formed in at least one of the seat cushion and the seat back; and a side frame cover configured to cover at least part of the cushion side frame. The side frame cover includes a duct cover portion configured to cover part of the duct at the rear side of the cushion frame.

17 Claims, 18 Drawing Sheets

(30) Foreign Application Priority Data

| Mar. 1, 2017 | (JP) | JP2017-038685 |
|---|---|---|
| Mar. 1, 2017 | (JP) | JP2017-038694 |
| Mar. 1, 2017 | (JP) | JP2017-038700 |

(51) Int. Cl.
*B60N 2/64* (2006.01)
*B60N 2/68* (2006.01)

(58) Field of Classification Search
CPC ...... B60N 2/70; B60N 2/7904; B60N 2/7055; B60N 2/7011; B60N 2/70411; B60H 1/00285; A47C 7/74; A47C 7/742
USPC .................................................. 297/180.14
See application file for complete search history.

(56) References Cited

U.S. PATENT DOCUMENTS

| 6,179,706 | B1* | 1/2001 | Yoshinori | B60N 2/5635 |
| | | | | 297/180.14 |
| 6,644,735 | B2 | 11/2003 | Bargheer et al. | |
| 7,673,935 | B2 | 3/2010 | Nishide et al. | |
| 8,668,225 | B2 | 3/2014 | Yamaki et al. | |
| 2002/0063451 | A1 | 5/2002 | Bargheer et al. | |
| 2004/0215381 | A1* | 10/2004 | Jitsui | B60R 21/01516 |
| | | | | 701/45 |
| 2005/0087325 | A1* | 4/2005 | Roland | B60N 2/5628 |
| | | | | 165/42 |
| 2005/0280294 | A1* | 12/2005 | Ishima | B60N 2/5635 |
| | | | | 297/180.1 |
| 2009/0121525 | A1* | 5/2009 | Nishide | B60N 2/5635 |
| | | | | 297/180.13 |
| 2010/0300644 | A1* | 12/2010 | Chung | B60N 2/5678 |
| | | | | 165/41 |
| 2012/0168421 | A1* | 7/2012 | Kawaguchi | B23K 26/0676 |
| | | | | 219/383 |
| 2013/0113265 | A1* | 5/2013 | Ota | B60N 2/5657 |
| | | | | 297/452.47 |
| 2013/0140859 | A1* | 6/2013 | Yamaki | B60R 21/207 |
| | | | | 297/216.13 |
| 2013/0264857 | A1* | 10/2013 | Ota | A47C 7/744 |
| | | | | 297/452.47 |
| 2016/0280038 | A1* | 9/2016 | Tanaka | B60H 1/00564 |
| 2016/0347217 | A1* | 12/2016 | Nishimura | B60N 2/5635 |
| 2017/0080837 | A1* | 3/2017 | Cho | B60N 2/5657 |
| 2018/0043807 | A1 | 2/2018 | Arata | |
| 2018/0065525 | A1* | 3/2018 | Higashihara | B60N 2/5657 |
| 2018/0201089 | A1* | 7/2018 | Fujii | B60H 1/00521 |
| 2019/0054793 | A1* | 2/2019 | Fujii | B60H 1/00285 |
| 2019/0092197 | A1* | 3/2019 | Arata | B60N 2/565 |
| 2019/0176663 | A1* | 6/2019 | Hoshi | B60N 2/5642 |

FOREIGN PATENT DOCUMENTS

| JP | S637013 | 1/1988 |
| JP | H01172013 | 7/1989 |
| JP | H10276859 | 10/1998 |
| JP | 2000152849 | 6/2000 |
| JP | 2007106290 | 4/2007 |
| JP | 2009023477 | 2/2009 |
| JP | 2012206649 | 10/2012 |
| JP | 2012224228 | 11/2012 |
| JP | 2014036744 | 2/2014 |
| JP | 2014094622 | 5/2014 |
| JP | 2016078709 | 5/2016 |
| JP | 2016164028 | 9/2016 |
| KR | 20130053542 | 5/2013 |
| KR | 101284313 | 7/2013 |
| WO | 2004020231 | 3/2004 |

OTHER PUBLICATIONS

Extended European Search Report issued for European Patent Application No. 17898446.4, dated Dec. 6, 2019, 8 pages.

International Search Report and Written Opinion issued for International Patent Application No. PCT/JP2017/032978, dated Nov. 28, 2017, 9 pages including English translation of Search Report.

Office Action issued for Chinese U.S. Appl. No. 201780087790.3, dated Jul. 27, 2021, 19 pages including English translation.

Office Action issued for Indian Patent Application No. 201947038522, dated Oct. 1, 2021, 5 pages.

\* cited by examiner

VEHICLE SEAT

TECHNICAL FIELD

The present invention relates to a vehicle seat.

BACKGROUND ART

Conventionally, a car seat including a seat cushion and a seat back in which outlet openings and air passages are formed, a blower attached to a bottom surface of the seat cushion, and a duct connecting the blower and an air passage of the seat back is known in the art, wherein the blower is configured to force conditioned air through the air passages and the duct to the outlet openings (Patent Document 1).

Another car seat including a blower provided on a lower part of a seat cushion, a first duct connecting the blower and an air passage of the seat cushion, and a second duct connecting the blower and an air passage of a seat back is known in the art (Patent Document 2). In this technique, the duct has an end portion inserted in a through hole formed in a urethane pad of the seat cushion or the seat back, and is connected to the seat cushion or the seat back.

Still another car seat is known, which is configured such that an introducing passage for introducing air blown by a blower unit to an inside of the seat and air distributing passages for distributing air fed through the introducing passage to a surface of the seat are provided in a urethane pad of a seat cushion or a seat back, wherein conditioned air provided from the introducing passage to the air distributing passages is blown out from the surface of the seat (Patent Document 3).

CITATION LIST

Patent Literature

Patent Document 1: JP 2009-023477 A
Patent Document 2: JP 2016-164028 A
Patent Document 3: JP 2000-152849 A

SUMMARY OF INVENTION

According to the technique of Patent Document 1, the duct is exposed at the rear side of the seat cushion; this would entail some risk of collision of a foot of an occupant seated on the rear seat against the duct.

To elaborate, in view of the risk, as would be entailed in the technique in Patent Document 1, of collision of a foot of an occupant seated on the rear seat against the duct connecting the blower and the air passage of the seat back, it would be desirable to implement a configuration which can reduce the possibility that a foot of an occupant seated on the rear seat hits the duct. In this configuration where the duct is provided, it would also be desirable to make the seat compact.

In the technique as in Patent Document 2, where a plate-shaped pressure-receiving member for receiving a load from an occupant is disposed under the urethane pad of the seat cushion or at the rear of the urethane pad of the seat back, a back surface of a pad member such as the urethane pad is covered with the pressure-receiving member; in this configuration as well, it would be desirable to make it easy to connect the air passage of the pad member and the duct.

In the technique of Patent Document 3, in order to allow air to be distributed in a wide area of the seat surface and to blow out as the conditioned air, a large number of air distributing passages are provided which extend radially from the air introducing passage. However, such a configuration would weaken airflow in each air distributing passage and hinder the air to flow in the pad fluently, which may possibly break the force of the airflow blown out of the seat surface.

An air passage provided in a pad of a seat to allow air to flow is expected to allow the air to flow as desired.

In view of the above, it is an object of the present invention to provide a vehicle seat which can restrain a duct from being hit by a foot of an occupant seated on a rear seat.

It is another object of the present invention to reduce the number of parts for a vehicle seat.

It is yet another object of the present invention to restrain deformation of or other detrimental effects on a duct.

It is yet another object of the present invention to increase a rigidity of a duct.

It is yet another object of the present invention to ensure a sufficient amount of flow of air flowing through a duct.

It is yet another object of the present invention to make a vehicle seat compact.

It is yet another object of the present invention to a restrain a duct from moving.

It is yet another object of the present invention to restrain interference between a duct and other member.

It is yet another object of the present invention to reduce a detrimental effect caused when a duct comes in contact with other member.

It is yet another object of the present invention to make it easy to connect an air passage and a duct.

It is yet another object of the present invention to allow air to flow through a duct fluently.

It is yet another object of the present invention to protect a portion at which a duct is connected to a pad member.

It is yet another object of the present invention to allow air to distribute over a wide area of a seat surface and flow in a pad in a desired configuration.

It is yet another object of the present invention to arrange ventilation holes communicating with an air passage in a manner that permits efficient airflow.

It is yet another object of the present invention to improve ride comfort.

It is yet another object of the present invention to restrain excessive deformation of a pad including an air passage.

It is yet another object of the present invention to make it easy to form a pad including an air passage and ventilation holes.

It is yet another object of the present invention to allow air to flow fluently.

It is yet another object of the present invention to increase coolness.

It is yet another object of the present invention to make it easy to form a pad including an air passage.

The present invention contrived to achieve any of the objects mentioned above provide a vehicle seat with a seat cushion and a seat back, the vehicle seat comprising: a pair of side frames; a duct extending from the seat cushion along a rear side of a frame of the seat cushion toward the seat back and connecting an air passage and a blower, the air passage being formed in at least one of the seat cushion and the seat back; and a side frame cover configured to cover at least part of the side frame, wherein the side frame cover includes a duct cover portion configured to cover at least part of the duct at the rear side of the frame of the seat cushion.

With this configuration, the duct can be protected at the rear side of the seat cushion, and thus the duct can be made unlikely to be hit by a foot of an occupant seated on a rear seat. In addition, since the necessity to provide a cover for the side frame and a cover for the duct individually can be obviated, the number of parts for the vehicle seat can be reduced.

The vehicle seat described above may be configured such that the duct includes a flexible portion having flexibility at the rear side of the frame of the seat cushion, wherein the duct cover portion is configured to cover at least part of the flexible portion.

With this configuration, the flexible portion of the duct can be made unlikely to be hit by a foot of an occupant seated on a rear seat.

The vehicle seat described above may comprise a reclining mechanism by which the seat back is supported rotatably relative to the seat cushion, wherein the side frame cover includes a reclining mechanism cover portion configured to cover the reclining mechanism.

With this configuration, the side frame cover may be configured to not only serve to protect the duct but also serve to protect the reclining mechanism, with the result that the number of parts for the vehicle seat can be reduced further.

The vehicle seat described above may be configured such that the duct includes a narrower portion which is located at the rear side of the frame of the seat cushion and of which a dimension in a lateral direction is smaller than a dimension in a direction perpendicular to the lateral direction.

With this configuration, the smaller dimension in the lateral direction of the narrower portion may serve to reduce the risk of collision of a foot of an occupant seated on the rear seat against the narrower portion of the duct. Moreover, since the narrower portion is configured to have a shape that is strong enough to bear a load placed from a direction perpendicular to the lateral direction, deformation of or other detrimental effects on the duct can be restrained effectively even if the narrower portion is hit by a foot of an occupant seated on the rear seat.

The vehicle seat described above may be configured such that the duct includes a wider portion which is located under the seat cushion and extends in a front-rear direction and of which a dimension in the lateral direction is greater than a dimension in a vertical direction, and a connecting portion connecting the narrower portion and the wider portion, wherein the connecting portion has a dimension in the lateral direction increasing with increasing distance from the narrower portion toward the wider portion, and a dimension in the vertical direction decreasing with increasing distance from the narrower portion toward the wider portion.

With this configuration, in which the cross-sectional shape of the duct gradually changes from the narrower portion toward the wider portion, the rigidity of the duct can be enhanced more effectively in comparison with an alternative configuration in which the cross-sectional shape does not change. Moreover, since an undesirable shrinkage of the cross-sectional area of the flow pass inside the connecting portion of the duct can be restrained, a sufficient amount of flow of air flowing through the duct can be ensured. Furthermore, since the wider portion located under the seat cushion is configured to be smaller in vertical dimension and thus can be made vertically thinner, the vehicle seat can be made compact in vertical dimension.

The vehicle seat described above may be configured such that the duct cover portion includes a protruding portion protruding toward the duct, the protruding portion being engageable with the duct.

With this configuration, the engagement of the protruding portion of the duct cover portion with the duct may restrict the position of the duct, so that the duct can be restrained from moving.

The vehicle seat described above may be configured such that the pair of side frames include a pair of cushion side frames constituting left and right frames of the seat cushion, wherein the frame of the seat cushion includes, in addition to the pair of the cushion side frames, a rear frame connecting rear portions of the pair of cushion side frames, wherein the duct includes a bellows portion configured as the flexible portion at a rear side of the rear frame, and wherein the bellows portion is located above a lower end of the rear frame.

With this configuration, the bellows portion of the duct can be made unlikely to be hit by a foot of an occupant seated on a rear seat more effectively in comparison with an alternative configuration in which the bellows portion is located below the lower end of the rear frame.

The vehicle seat described above may be configured such that the pair of side frames include a pair of cushion side frames constituting left and right frames of the seat cushion, wherein the frame of the seat cushion includes, in addition to the pair of the cushion side frames, a front frame connecting front portions of the pair of cushion side frames, and a rear frame connecting rear portions of the pair of cushion side frames, wherein the vehicle seat further comprises a wire member laid to connect the front frame and the rear frame, wherein the wire member includes a hook portion hooked on the rear frame, and wherein a portion of the duct extending along a rear side of the rear frame is located at a position different from a position of the hook portion in the lateral direction.

With this configuration, interference between the duct and the wire member can be restrained.

The vehicle seat described above may comprise a sensor located under one of the pair of side frames, wherein the duct is, in the lateral direction, located closer to another of the pair of side frames than to the one of the pair of side frames.

With this configuration, interference between the duct and the sensor, electric wires extending from the sensor, and/or other members can be restrained.

The vehicle seat described above may be configured such that the duct includes a retreated portion located, at the rear side of the frame of the seat cushion, in a position laterally inward of the pair of side frames and closer to one of the side frames than to a laterally central position between the pair of side frames.

With this configuration, since the retreated portion of the duct is located in a position shifted to one of the side frames at the rear of the seat cushion, the duct can be made unlikely to be hit by a foot of an occupant seated on a rear seat. Moreover, since the retreated portion is located in a position laterally inward of the pair of side frames, the vehicle seat can be made more compact in lateral dimension in comparison with an alternative configuration in which the retreated portion is located in a position laterally outward of the pair of side frames.

The vehicle seat described above may be configured such that the retreated portion extends obliquely in a downward-and-frontward direction.

With this configuration, since the retreated portion of the duct is located in a position away from a foot of an occupant seated on a rear seat, at the rear of the seat cushion, the duct can be made more unlikely to be hit by the foot of the occupant seated on the rear seat.

The vehicle seat described above may be configured such that the pair of side frames include a pair of cushion side frames constituting left and right frames of the seat cushion, wherein the vehicle seat further comprises a supporting member located between the pair of cushion side frames to receive a load from an occupant, and wherein the duct includes a lower inclined portion located under the supporting member, the lower inclined portion extending obliquely in a rearward-and-downward direction.

With this configuration, interference between the duct and the supporting member can be restrained.

The vehicle seat described above may be configured such that the duct includes a wider portion which is located under the seat cushion and extends in a front-rear direction, and of which a dimension in a lateral direction is greater than a dimension in a vertical direction.

With this configuration, the wider portion located under the seat cushion is configured to be smaller in vertical dimension and thus can be made vertically thinner. Accordingly, the vehicle seat can be made compact in vertical dimension.

The vehicle seat described above may be configured such that the pair of side frames include a pair of cushion side frames constituting left and right frames of the seat cushion, wherein the vehicle seat further comprises a supporting member located between the pair of cushion side frames to receive a load from an occupant, and wherein the wider portion is located, under the supporting member, in a position closer to the one of the side frames than to a laterally central position between the pair of side frames.

With this configuration, even though a load received by the supporting member from an occupant would cause the center portion of the seat cushion to sag down more greatly than the left and right side portions of the seat cushion, location of the wider portion shifted to the one of the side frames makes it possible to restrain interference between the duct and the supporting member.

The vehicle seat described above may be configured such that the retreated portion includes a narrower portion of which a dimension in the lateral direction is smaller than a dimension in a direction perpendicular to the lateral direction, wherein the duct includes a connecting portion connecting the narrower portion and the wider portion, and wherein the connecting portion has a dimension in the lateral direction increasing with increasing distance from the narrower portion toward the wider portion, and a dimension in a vertical direction decreasing with increasing distance from the narrower portion toward the wider portion.

With this configuration, in which the cross-sectional shape of the duct gradually changes from the narrower portion toward the wider portion, the rigidity of the duct can be enhanced more effectively in comparison with an alternative configuration in which the cross-sectional shape does not change. Moreover, since an undesirable shrinkage of the cross-sectional area of the flow pass inside the connecting portion of the duct can be restrained, a sufficient amount of flow of air flowing through the duct can be ensured. Furthermore, since the narrower portion is configured to have a shape that is strong enough to bear a load placed from a direction perpendicular to the lateral direction, deformation of or other detrimental effects on the duct can be restrained effectively even if the narrower portion is hit by a foot of an occupant seated on the rear seat.

The vehicle seat described above may comprise a supporting member located between the pair of side frames to receive a load from an occupant, wherein the duct includes a portion located at a side opposite to an occupant side of the supporting member, wherein the supporting member includes a plurality of wire members arranged in rows and a plastic member connecting the wire members, and wherein the plastic member is located to overlap the duct as viewed from the occupant side.

With this configuration, even when the supporting member sags down and interferes with the duct, the plastic member first comes in contact with the duct; therefore, detrimental effects which would be caused by the contact of the supporting member with the duct, for example, noises produced and/or shock given upon the contact, etc., can be reduced.

The vehicle seat described above may be configured such that the duct includes a lower tubular portion located under the seat cushion, the lower tubular portion comprising: a first portion extending in a front-rear direction, the first portion having a front end connected to the blower; a second portion extending from a rear end of the first portion obliquely in a laterally-outward-and-rearward direction; a third portion extending from a rear end of the second portion rearward; and a branch tubular portion extending from the third portion upward and connected to the air passage formed in the seat cushion.

With this configuration, the branch tubular portion can be provided in such a location that it does not overlap any member (e.g., the wire member) located within the seat cushion, so that the duct can be connected easily to the air passage formed in the seat cushion.

The vehicle seat described above may be configured such that the lower tubular portion comprising: a fourth portion extending from a rear end of the third portion obliquely in a laterally-outward-and-rearward direction; and a fifth portion extending from a rear end of the fourth portion rearward.

With this configuration, since the duct can be routed to gradually change its direction toward one of the side frames, an abrupt change in the flow pass can be restrained, so that air can be let flow through the duct fluently.

The vehicle seat described above may comprise: a plate-shaped pressure-receiving member configured to receive a load from an occupant; and a pad member configured to cover an occupant side of the pressure-receiving member, wherein the air passage is formed in the pad member, wherein the duct is connected to the air passage from a side opposite to an occupant side of the pad member, and wherein the pressure-receiving member has an opening through which the duct is disposed.

With this configuration, the duct can be connected through the opening of the pressure-receiving member to the air passage formed in the pad member; therefore, even in the presence of the plate-shaped pressure-receiving member, the duct can be easily connected to the air passage of the pad member.

The vehicle seat described above may comprise a connecting frame connecting the pair of side frames, wherein the duct includes a first flat portion which is located at a side opposite to an occupant side of the connecting frame, and of which a dimension in an opposed direction in which the first flat portion is opposed to the connecting frame is smaller than a dimension in a direction perpendicular to the opposed direction.

With this configuration, the first flat portion can be made thinner in the opposed direction, so that the vehicle seat can be made compact in the opposed direction. Besides the compactness achieved, a sufficient clearance can be left between the first flat portion and the connecting frame, so that interference between the duct and the connecting frame can be restrained.

The vehicle seat described above may comprise a cover member configured to cover a portion at which the duct is connected to the air passage, from a side opposite to an occupant side.

With this configuration, the portion at which the duct is connected to the pad member can be protected by the cover member.

The vehicle seat described above may comprise an S spring laid to connect the pair of side frames, wherein the opening is so located as not to overlap the S spring as viewed from the occupant side.

With this configuration, the duct can be routed easily to the opening of the pressure-receiving member, so that the duct can be connected easily to the air passage of the pad member.

The vehicle seat described above may comprise an S spring laid to connect the pair of side frames, wherein the duct includes a second flat portion which is located at a side opposite to an occupant side of the S spring, and of which a dimension in an opposed direction in which the second flat portion is opposed to the S spring is smaller than a dimension in a direction perpendicular to the opposed direction.

With this configuration, the second flat portion can be made thinner in the opposed direction, so that the vehicle seat can be made compact in the opposed direction. Besides the compactness achieved, a sufficient clearance can be left between the second flat portion and the S spring, so that interference between the duct and the S spring can be restrained.

The vehicle seat described above may comprise a wire member connecting the pressure-receiving member to the frame of the seat, wherein the wire member includes a pair of extension portions extending in a predetermined direction and arranged side by side with each other in a direction perpendicular to the predetermined direction at a position in which the wire member overlaps the pressure-receiving member as viewed from the occupant side, and wherein the opening is located between the pair of the extension portions.

Alternatively, the vehicle seat described above may comprise a wire member connecting the pressure-receiving member to the frame of the seat, wherein the wire member includes an extension portion extending in a predetermined direction and located at a position in which the wire member overlaps the pressure-receiving member as viewed from an occupant side, and wherein the opening is located at an outer side of the extension portion in a direction perpendicular to the predetermined direction.

The vehicle seat described above may comprise a pad, the pad including the air passage and a plurality of first ventilation holes, the first ventilation holes extending from an occupant-side surface to the air passage, wherein the air passage includes, as viewed from an occupant side, a first air passage of which one end is connected to the blower, a second air passage extending from another end of the first air passage in a direction different from a direction in which the first air passage extends, and a third air passage extending from an opposite end that is an end of the second air passage opposite to an end of the second air passage which is connected to the first air passage, toward the one end of the first air passage, and wherein the first ventilation holes include at least one first hole connected to the first air passage, and at least one second hole connected to the third air passage.

With this configuration, since the first ventilation holes include at least one first hole connected to the first air passage and at least one second hole connected to the third air passage, air can be distributed over a wide area of the surface of the seat. On the other hand, the first air passage, the second air passage and the third air passage can be formed as a continuous flow passage, so that the number of flow passages connected to the blower can be reduced. Accordingly, the force of air in the air passage can be restrained from being broken, so that air can be flown fluently in the pad.

The vehicle seat described above may be configured such that the first hole is formed in a plurality of positions along the first air passage, wherein the second hole is formed in a plurality of positions along the third air passage, and wherein a row of the first holes and a row of the second holes are arranged side by side with each other in a direction of extension of the second air passage.

With this configuration, the air can be distributed over a wide area of the surface of the seat, and the plurality of first ventilation holes can be arranged in a manner that permits efficient airflow.

The vehicle seat described above may be configured such that the first air passage extends in a direction nonparallel to a lateral direction, wherein the second air passage extends from the another end of the first air passage laterally inward, wherein the third air passage extends from the opposite end of the second air passage opposite to the end of the second air passage which is connected to the first air passage, in a direction nonparallel to the lateral direction, and wherein two flow passages each consisting of the first air passage, the second air passage and the third air passage are formed bisymmetrically at a left side and at a right side.

With this configuration, an occupant can be supported in good balance by portions of the pad which have no air passage formed therein; therefore, even if the air passage includes the first air passage, the second air passage and the third air passage, an increased ride comfort can be provided.

The vehicle seat described above may comprise a pad supporting member located at a side opposite to an occupant side of the pad to support the pad, wherein the pad supporting member is so located as to overlap at least part of the first air passage, the second air passage and the third air passage as viewed from the occupant side.

With this configuration, even though the portions of the pad which have the first air passage, the second air passage and the third air passage formed therein are likely to deform, these portions can be supported by the pad supporting member, so that an excessive deformation of the pad can be restrained.

The vehicle seat described above may be configured such that the pad supporting member has a shape of a plate.

With this configuration, the portions of the pad which have the first air passage, the second air passage and the third air passage formed therein can be supported by a surface of the plate-shaped pad supporting member, so that an excessive deformation of the pad can be restrained.

The vehicle seat described above may be configured such that the pad has a second ventilation hole extending from a surface at a side opposite to an occupant side thereof, to the air passage, wherein the air passage includes a fourth air passage extending laterally and connecting the one end of the first air passage at the left side and the one end of the first air passage at the right side, and a fifth air passage connecting the second ventilation hole and the fourth air passage, wherein the second ventilation hole is located at a position shifted from a laterally central position of the pad leftward or rightward, and wherein the fifth air passage extends from the second ventilation hole obliquely toward the laterally central position of the pad and is connected to the fourth air passage.

With this configuration, in which the fifth air passage connecting the second ventilation hole and the fourth air passage may have no sharp bend, air can be let flow from the second ventilation hole to the fourth air passage fluently.

The vehicle seat described above may be configured such that the pad includes a first member having formed therein a groove constituting the air passage, and a second member having the first ventilation holes formed therein and laid on a surface at an occupant side of the first member.

With this configuration, the pad can be formed with increased ease in comparison with an alternative configuration in which the air passage and the pad having the first ventilation hole connected to the air passage are integrally formed.

The vehicle seat described above may be configured such that the first member includes a first member body and a groove-forming member laid on a surface at an occupant side of the first member body, the groove-forming member having a slot piercing therethrough to form the groove.

With this configuration, the first member having the air passage including the first, second and third air passages provided therein can be formed easily, so that the pad can be formed with increased ease.

The vehicle seat described above may comprise a pad having the air passage and a first ventilation hole formed therein, the first ventilation hole extending from a surface at an occupant side of the pad to the air passage, wherein the air passage includes a first air passage extending along the surface at the occupant side of the pad, and wherein the first air passage has an opposed surface facing to the first ventilation hole, and the opposed surface extending toward an edge of the pad as viewed from the occupant side is angled in an oblique direction toward the occupant side.

With this configuration, air to be directed to pass through the first ventilation hole can be guided to flow along the slope provided by the opposed surface, so that the air can be let flow fluently.

The vehicle seat described above may be configured such that the first air passage has one end that is closed, wherein the opposed surface is located over an end portion of the first air passage closer to the one end.

With this configuration, the slope of the opposed surface can be utilized for letting the air flow more effectively in comparison with an alternative configuration in which an opposed surface is located at some midpoint of the first air passage. Accordingly, air can be let flow more fluently.

The vehicle seat described above may be configured such that the pad includes a center portion and a pair of side portions provided at left and right sides of the center portion, the pair of side portions bulging farther on the occupant side than the center portion, wherein the first ventilation hole is located in an end portion of the center portion in a lateral direction, and wherein air is blown out through the first ventilation hole.

With this configuration, the air forced to stream quickly along the slope of the opposed surface can be blown out through the first ventilation hole, to graze past the body of an occupant, so that increased coolness can be enjoyed.

The vehicle seat described above may be configured such that the pad includes a second ventilation hole extending from a surface at a side opposite to the occupant side to the air passage, wherein the air passage includes a second air passage connecting the first air passage and the second ventilation hole and extending from a position of connection to the first air passage in one of perpendicular directions perpendicular to the lateral direction, and wherein the first air passage extends obliquely, with respect to the perpendicular directions, deviating in a direction opposite to the one of the perpendicular directions increasingly with increasing distance from the second air passage toward a laterally outer end of the pad.

With this configuration, the air introduced from the second ventilation hole can be let flow through the second air passage to the first air passage fluently.

The vehicle seat described above may be configured such that the pad includes a first member having formed therein a groove constituting the air passage and a second member having the first ventilation hole formed therein, the second member being laid on a surface at an occupant side of the first member, wherein the opposed surface is formed in the first member.

With this configuration, the pad provided with an air passage having an inclined opposed surface formed therein can be formed with increased ease.

DESCRIPTION OF EMBODIMENTS

Hereinafter, a description will be given of one embodiment of the invention with reference made to accompanying drawings. In this description, the front/rear (frontward/rearward), left/right (leftward/rightward; lateral), and upper/lower (upward/downward; vertical) are represented with reference to the front/rear, left/right, and upper/lower directions as viewed from a person seated on the seat.

Figure 1:
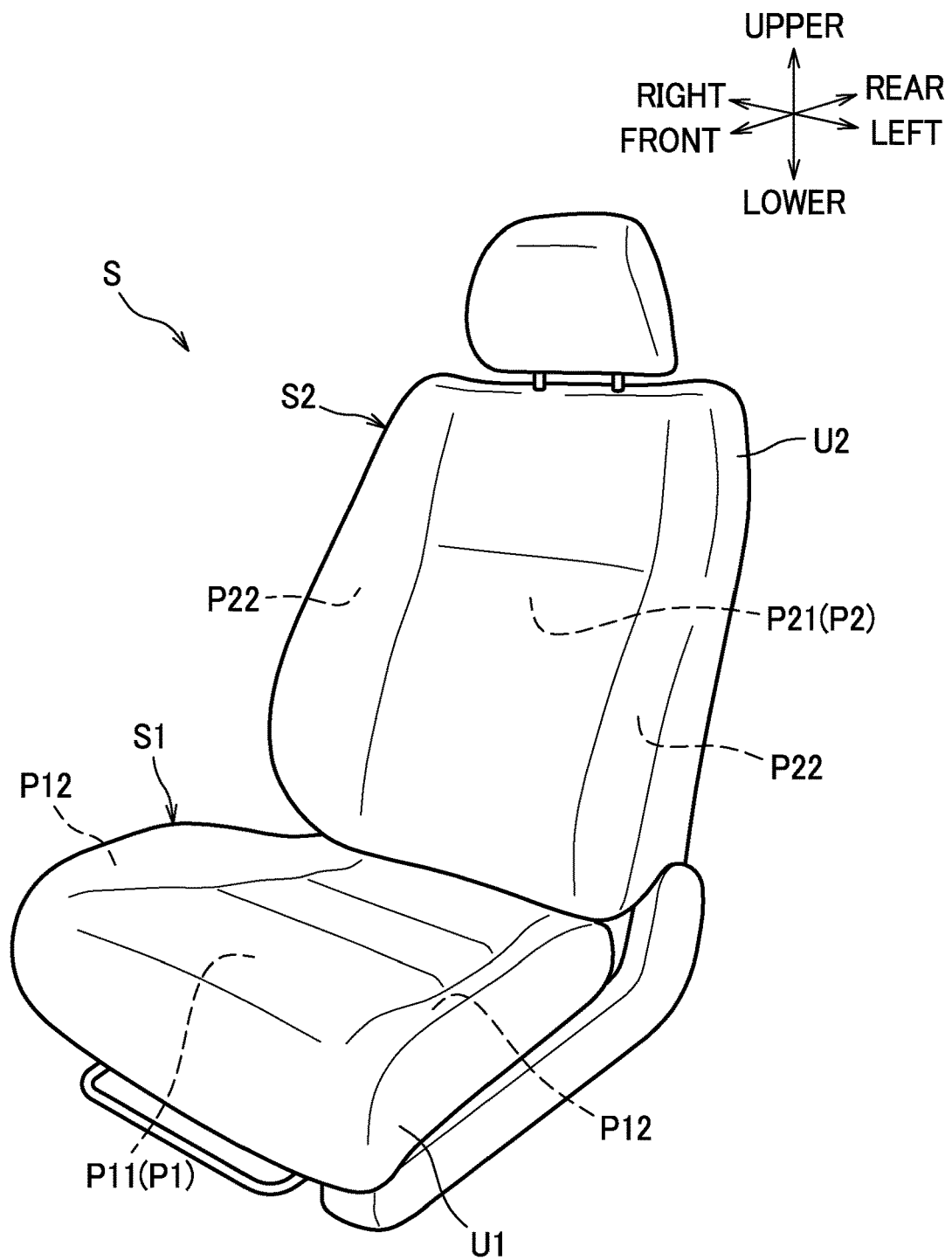
FIG. 1 is a view showing a car seat as a vehicle seat according to an embodiment.

As shown in FIG. 1, a vehicle seat of the present embodiment is configured as a car seat S installed in an automobile, and includes a seat cushion S1 and a seat back S2.

Figure 2:
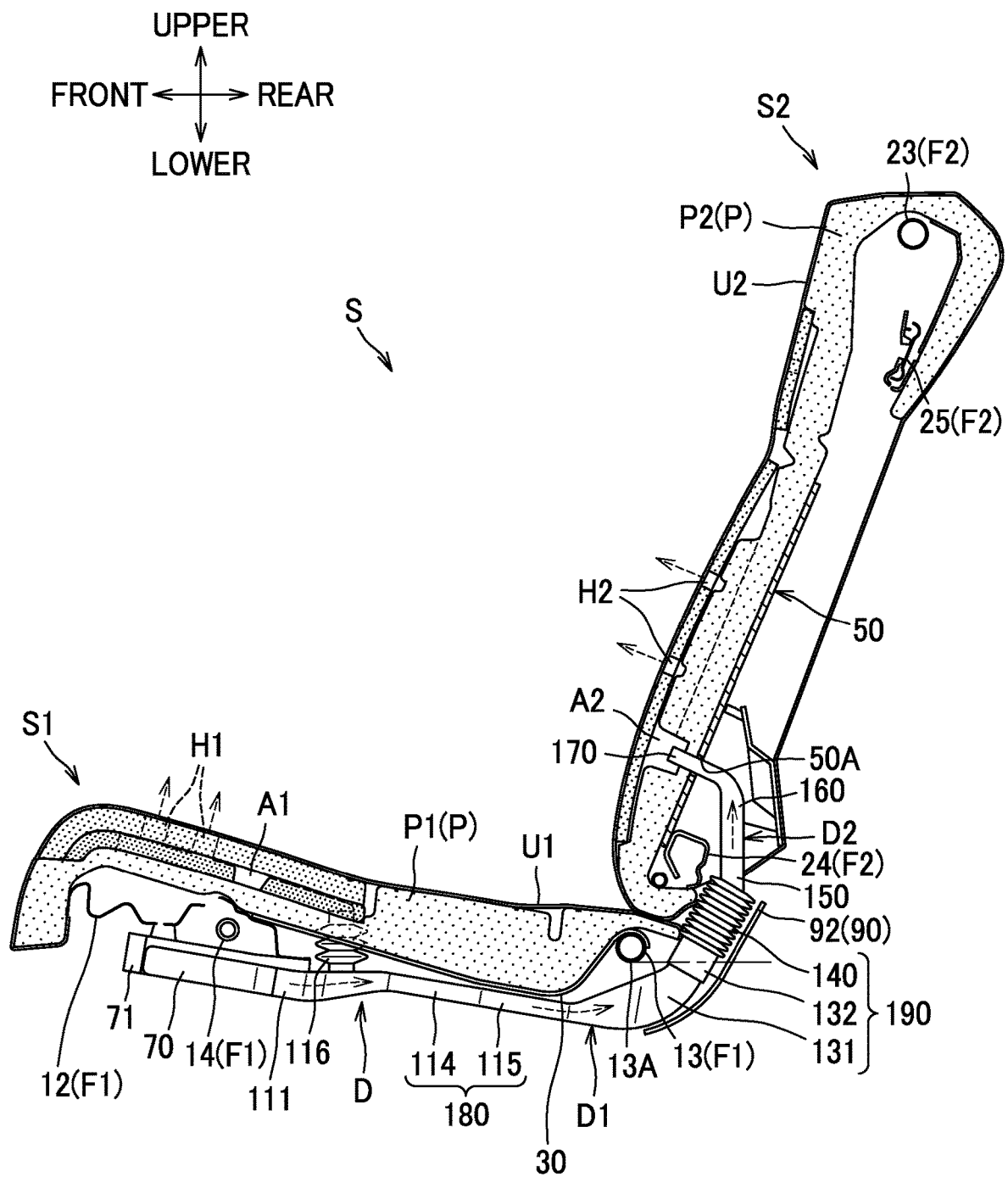
FIG. 2 is a section view of a car seat.

As shown in FIG. 2, the car seat S is constructed of a seat frame F (see FIG. 3) constituting a frame of the seat upholstered with a pad P made of urethane foam or the like and outer coverings U1, U2 made of fabrics, leather or the like. The pad P is, as will be described later in detail, configured to have air passages A1, A2 formed therein, and first ventilation holes H1, H2 formed to extend from an occupant-side surface to the air passages A1, A2, and the car seat S is configured to cause air forced from a blower 70 to pass through a duct D and the air passages A1, A2 and to be blown out from the first ventilation holes H1, H2 to an occupant seated on the seat.

Figure 3:
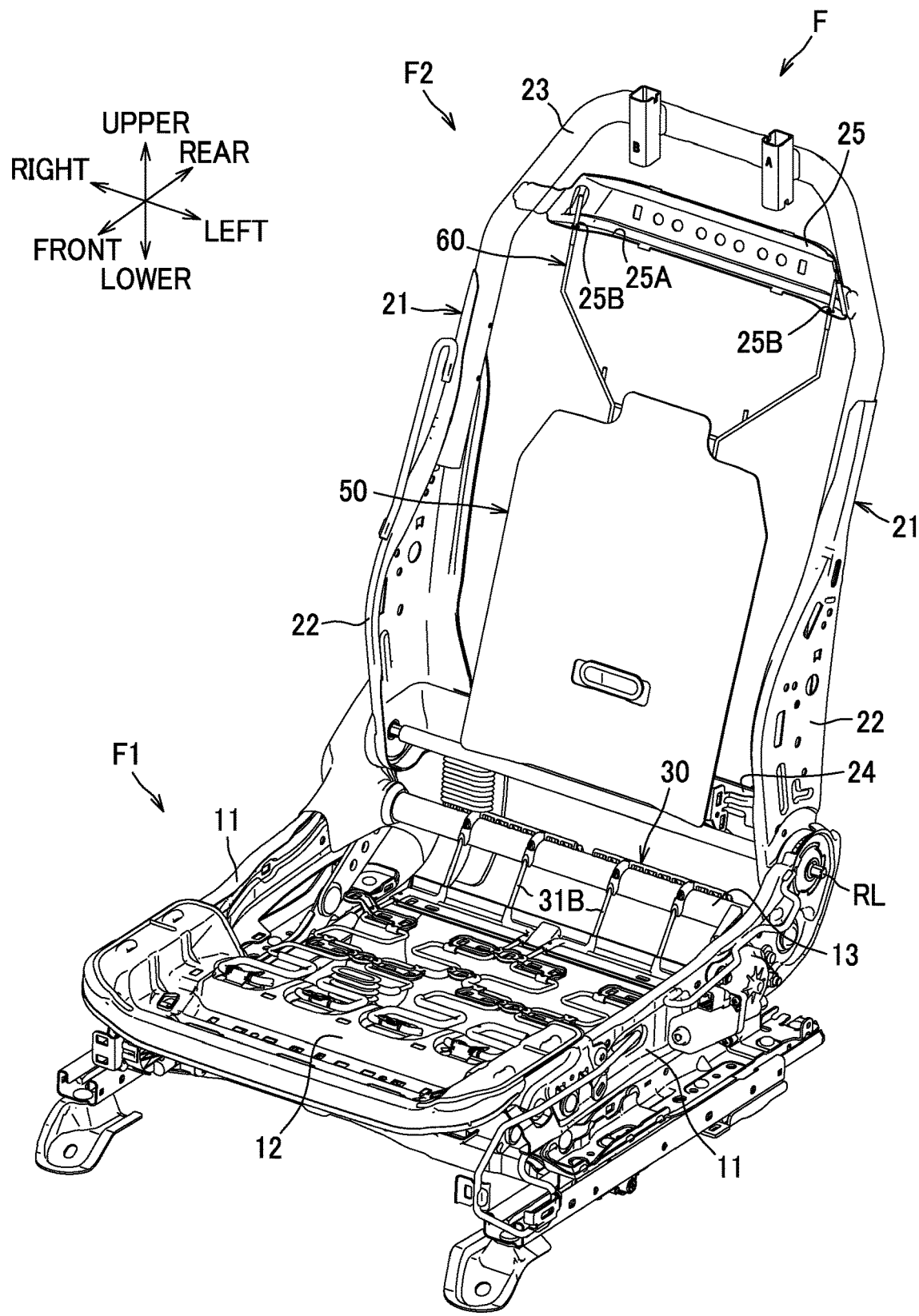
FIG. 3 is a view showing a seat frame, a supporting member and a pressure-receiving member.

As shown in FIG. 3, the seat frame F includes a cushion frame F1 constituting a frame of the seat cushion S1 and a back frame F2 constituting a frame of the seat back S2. The back frame F2 is connected to the cushion frame F1 via a reclining mechanism RL. The reclining mechanism RL is a part which has a known configuration and by which the seat back S2 is supported rotatably relative to the seat cushion S1. In the present embodiment, an upper side and a lower side of the seat cushion S1 relate respectively to "occupant side" and "side opposite to an occupant side". On the other hand, a front side and a rear side of the seat back S2 retained in an unreclined position by the reclining mechanism RL relate respectively to "occupant side" and "a side opposite to an occupant side".

The cushion frame F1 includes a pair of left and right side frames 11, a pan frame 12 as a front frame, a rear pipe 13 as a rear frame, and a front pipe 14 (see FIG. 4) as a connecting pipe. The pair of cushion side frames 11 are members constituting left and right frames of the seat cushion S1, opposed to each other in a lateral direction and arranged separately from each other. The cushion side frames 11 are each made of sheet metal, and formed in a shape elongate in a front-rear direction.

The pan frame 12 is a plate-shaped member connecting front portions of the pair of cushion side frames 11 and is made of sheet metal. The pan frame 12 has its left and right end portions joined to the front end portions of the cushion side frames 11 by welding.

Figure 4:
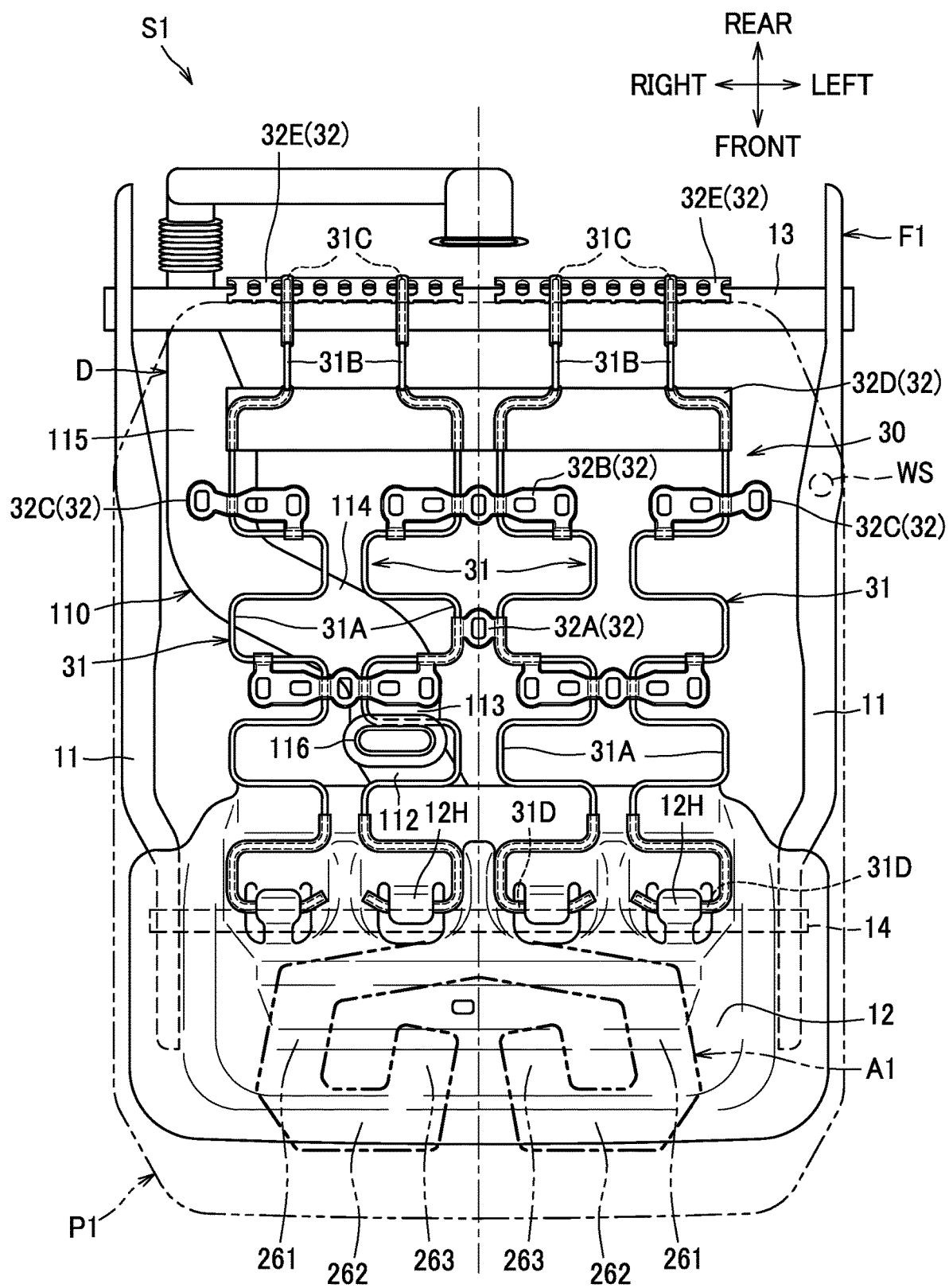
FIG. 4 is a view of a seat cushion as viewed from above.

As shown in FIG. 4, the rear pipe 13 and the front pipe 14 each made of metal pipe material are disposed separately from each other in the front-rear direction to connect the pair of cushion side frames 11. To be more specific, the rear pipe 13 is disposed rearward of the pan frame 12, separate from the pan frame 12, and configured to connect rear portions of the pair of cushion side frames 11. The front pipe 14 is disposed frontward of the rear pipe 13, separate from the rear pipe 13, and configured to connect front portions of the pair of cushion side frames 11. The front pipe 14 is disposed under the pan frame 12.

A supporting member 30 is disposed between the pair of cushion side frames 11 of the cushion frame F1. The supporting member 30 is a member configured to receive a load from an occupant seated on the seat, and includes a plurality of wire members 31 and a plastic member 32.

The wire members 31 are each made of metal wire rod, and laid to connect the pan frame 12 and the rear pipe 13. Each wire member 31 mainly includes a first extension portion 31A, a second extension portion 31B, and a rear hook portion 31C as a hook portion.

The first extension portion 31A extends in the front-rear direction while meandering with alternate turns to the left and to the right. The first extension portion 31A includes, at its front end, a front hook portion 31D hooked on a hook anchorage 12H formed in the pan frame 12. A front end portion of the first extension portion 31 which includes the front hook portion 31D is covered with plastic, which serves to restrain noises that would be produced by contact between the wire member 31 (supporting member 30) and the pan frame 12.

The second extension portion 31B extends from a rear end of the first extension portion 31A obliquely in a rearward-and-upward direction.

The rear hook portion 31C is a portion to be hooked on the rear pipe 13, extends from an upper end of the second extension portion 31B, and is crooked approximately in a shape of a segment of a circle.

The supporting member 30 includes four wire members 31, and the four wire members 32 are arranged side by side with each other in the lateral direction.

The plastic member 32 is a member connecting the wire members 31. The plastic member 32 is made of plastic, with which parts of the wire members 31 are covered around their entire circumferences, and is formed by insert molding or the like, integrally with the wire members 31. The plastic member 32 is configured to include a first plastic member 32A, a second plastic member 32B, third plastic members 32C, a fourth plastic member 32D, and a fifth plastic member 32E.

The first plastic member 32A connects approximately central portions in the front-rear direction of the four wire members 31.

The second plastic member 32B is disposed rearward of the first plastic member 32A, and connects approximately central portions in the front-rear direction of two wire members 31 located at central positions in the lateral direction.

The third plastic members 32C are disposed at left and right sides of the second plastic member 32B, and connect a laterally extending portion and a portion extending rearward from a laterally outer end of the laterally extending portion, of the first extension portion 31A of each of the wire members 31 located at laterally outer sides.

The plastic members 32A to 32C are formed with generally rectangular through holes (indication with reference characters omitted therefor) piercing through upper and lower sides. The supporting member 30 is configured to allow a wire harness or other member to be held thereat in that a clip or the like for use in holding a wire harness, etc. may be engaged with these through holes.

The fourth plastic member 32D is disposed rearward of the plastic members 32B, 32C, and connects rear end portions of the first extension portions 31A of the four wire members 31.

The fifth plastic member 32E connects rear end portions of two adjacent wire members 31, more specifically, the rear hook portions 31C. The fifth plastic member 32E is configured to cover the rear hook portions 31C to thereby restrain noises that would be produced by contact between the supporting member 30 and the rear pipe 13.

Figure 5:
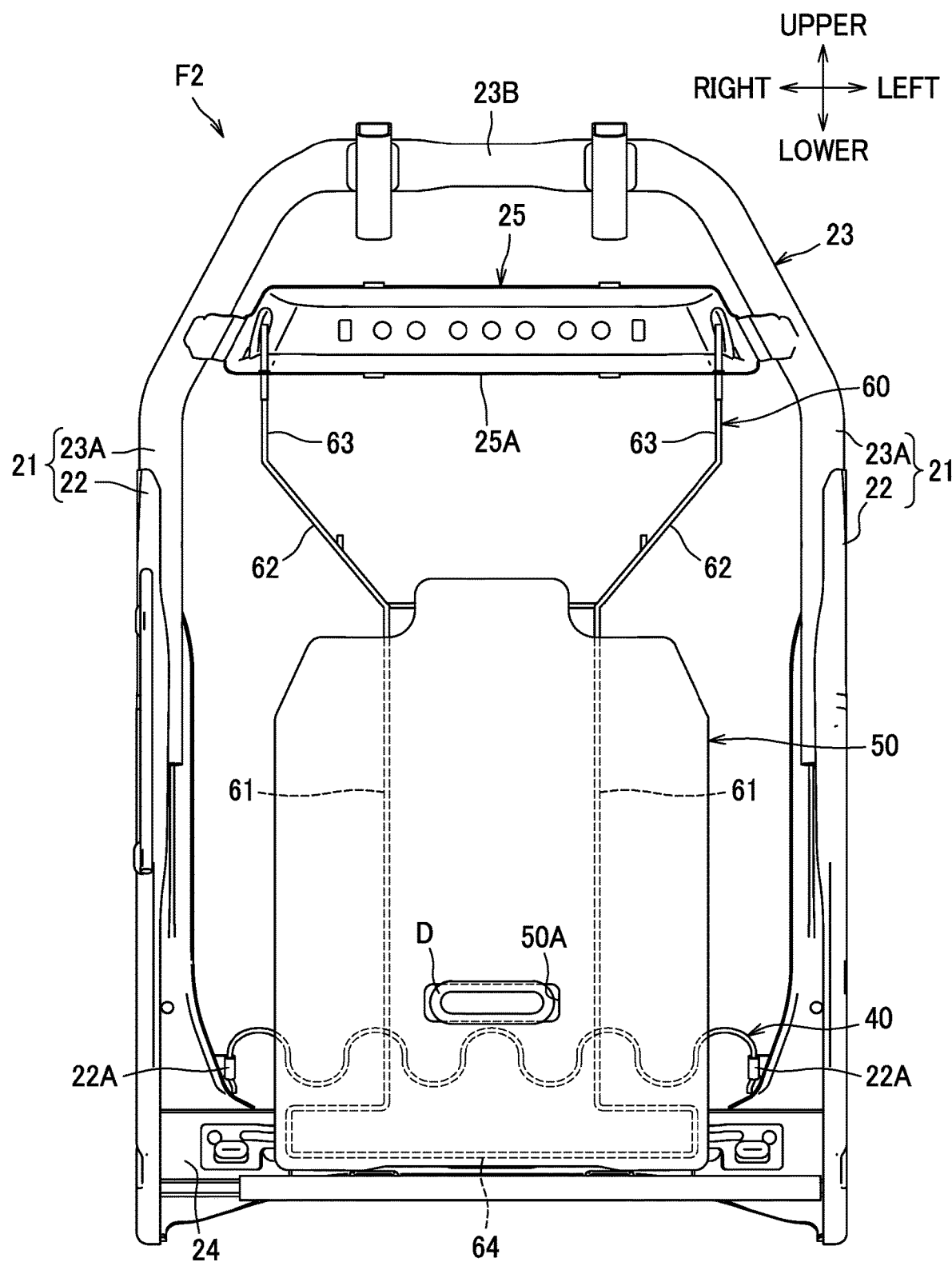
FIG. 5 is a view of a back frame and a pressure-receiving member as viewed from the front.

As shown in FIG. 5, the back frame F2 includes a pair of left and right sheet-metal frames 22, a pipe frame 23, a lower frame 24 as a connecting frame, and a bridging frame 25.

The pair of sheet-metal frames 22 are opposed to each other in the lateral direction and arranged separately from each other. Each sheet-metal frame 22 is made of sheet metal and formed in a shape elongate in a vertical direction.

The pipe frame 23 is made of metal pipe material and includes a pair of left and right upper side frames 23A extending approximately in the vertical direction, and an upper frame 23B extending to connect upper ends of the upper side frames 23A. The pair of upper side frames 23A have their lower portions joined to upper portions of the sheet-metal frames 22 by welding, and are thus combined with the pair of sheet-metal frame 22 to form a pair of back side frames 21. The pair of back side frames 21 constitute left and right frames of the seat back S2. In the present embodiment, "a pair of side frames" are configured to include the pair of back side frames 21, and the pair of cushion side frames 11 of the cushion frame F1.

The lower frame 24 is a member to connect lower portions of the pair of back side frames 21, and is made of sheet metal. The lower frame 24 has its left and right end portions joined to left and right inwardly extending rear end portions of the sheet-metal frames 22 that constitute the back side frames 21 by welding.

The bridging frame 25 is a member connecting upper portions of the pair of back side frames 21, and is made of sheet metal. The bridging frame 25 has its left and right end portions welded or otherwise joined to upper portions of the upper side frames 23A that constitute the back side frames 21. The bridging frame 25 includes, at its lower end, a lower extension portion 25A extending frontward, and left and right end portions of the lower extension portion 25A has supporting holes 25B (see FIG. 3) piercing through upper and lower sides thereof, such that a wire member 60 which will be described later is insertable through the supporting holes 25B.

An S spring 40, a pressure-receiving member 50 and a wire member 60 are disposed between the pair of back side frames 21 of the back frame F2.

The S spring 40 is formed by bending a metal wire alternately upward and downward. The S spring 40 is disposed above the lower frame 24, and laid to connect the pair of back side frames 21. To be more specific, the S spring 40 has its left and right end portions inserted from above into spring engageable portions 22A provided in lower portions of the sheet-metal frames 22, and is thus connected to the pair of back side frames 21 as if to connect the pair of back side frames 21.

The pressure-receiving member 50 is a plate-shaped member configured to receive a load from an occupant seated on the seat, and is made of plastic. The pressure-receiving member 50 is disposed to face the back of an occupant. The pressure-receiving member 50 has its lower end portion located frontward of the S spring 40. The pressure-receiving member 50 has an opening 50A piercing through a front side and a rear side thereof. The opening 50A is a hole through which the duct D is insertable, and formed approximately in a rectangular shape elongate in the lateral direction. The opening 50A is located in a laterally central portion of a lower portion of the pressure-receiving member 50. To be more specific, the opening 50A is located between a pair of extension portions 61 that will be described later. The opening 50A is so located as not to overlap the S spring 40 as viewed from the front side. Specifically, the opening 50A is located above the S spring 40.

The wire member 60 is a member connecting the pressure-receiving member 50 to the back frame F2, and mainly includes a pair of left and right extension portions 61, inclined portions 62, upper connecting portions 63, and a lower connecting portion 64.

The extension portions 61 extend in a vertical direction (a perpendicular direction perpendicular to the lateral direction) as a predetermined direction, and arranged side by side with each other in the lateral direction (a direction perpendicular to the predetermined direction).

The inclined portions 62 extend from upper ends of the extension portions 61 obliquely in laterally-outward-and-upward directions.

The upper connecting portions 63 extend from upper ends of the inclined portions 62 upward.

The lower connecting portion 64 connects the pair of the left and right extension portions 61, inclined portions 62 and upper connecting portions 63. To be more specific, the lower connecting portion 64 includes a lower end portion extending in the lateral direction, and extends from left and right ends of the lower end portion upward; the upward extending portions are then bent laterally inward, and extend to be connected to lower ends of the extension portions 61.

The wire member 60 is connected to the back frame F2 with the lower connecting portion 64 retained on a front side of the lower frame 24, and the upper connecting portions 63 inserted in the supporting holes 25B (see FIG. 3) formed in the lower extension portion 25A of the bridging frame 25. The pressure-receiving member 50 is disposed at the front side of the pair of extension portions 61 of the wire member 60 and fastened to the extension portions 61 by tie bands (not shown), thereby connected to the back frame F2 via the wire member 60. The pair of extension portions 61 are so located as to overlap the pressure-receiving member 50 as viewed from the front side.

As shown in FIG. 2, the car seat S includes a blower 70 and a duct D.

The blower 70 is a sirocco fan by way of example, and is located under the pan frame 12. To be more specific, the blower 70 is attached to the pan frame via a bracket 71.

Figure 6:
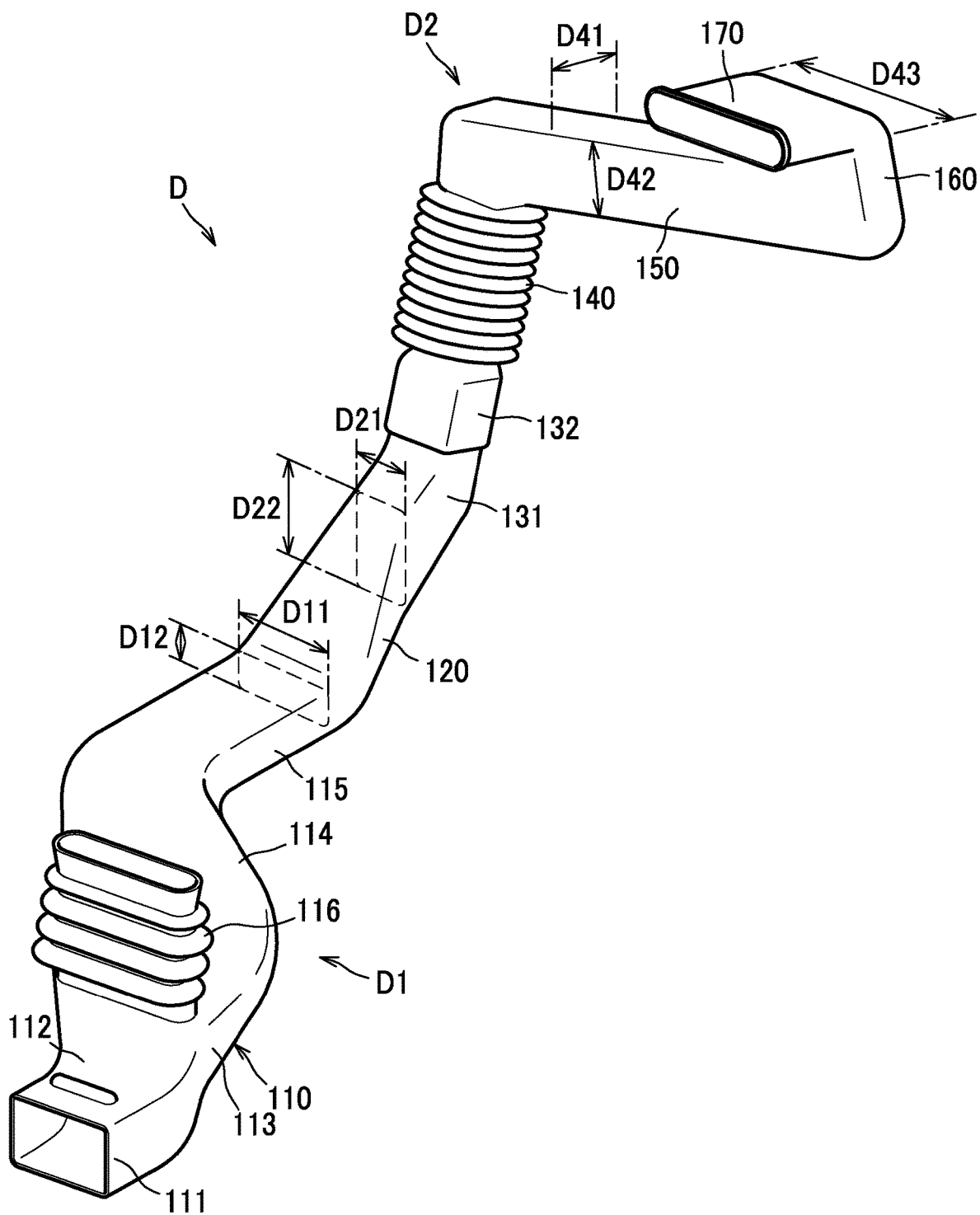
FIG. 6 is a view showing a duct.

The duct D is a member configured to connect the blower 70 to the air passages A1, A2 formed in the pad P of the seat cushion S1 and the seat back S2, and extends from under the seat cushion S1 along the rear side of the cushion frame F1 toward the seat back S2. As shown in FIG. 6, the duct D is configured to include a first duct D1 and a second duct D2 connected to a rear end portion of the first duct D1. The first duct D1 mainly includes a lower tubular portion 110, a connecting portion 120, and a first narrower portion 131, whereas the second duct D2 mainly includes a second narrower portion 132, a bellows portion 140 as a flexible portion, a first flat portion 150, a second flat portion 160, and a back-connecting portion 170. In the present embodiment, the first narrower portion 131 and the second narrower portion 132 correspond to "narrower portion".

Figure 7:
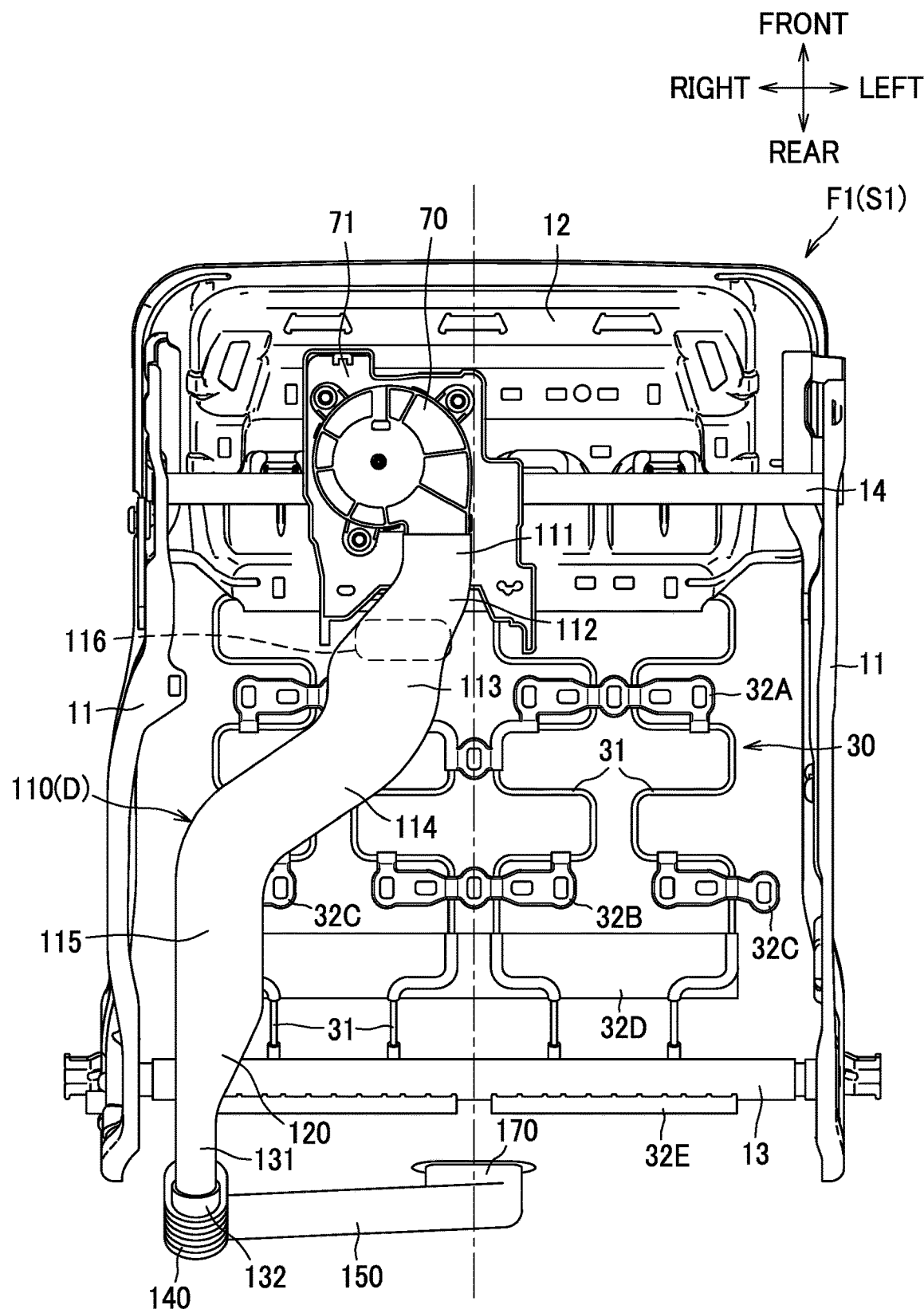
FIG. 7 is a view of a cushion frame, a supporting member, a blower, and a duct as viewed from below.

As shown in FIG. 7, the lower tubular portion 110 is a portion disposed under the seat cushion S1, more specifically, under the supporting member 30, and extends approximately in the front-rear direction. The lower tubular portion 110 includes a blower-connecting portion 111 as a first portion, a second portion 112, a third portion 113, a fourth portion 114, a wider portion 115 as a fifth portion, and a cushion-connecting portion 116 as a branch tubular portion (see also FIG. 6).

The blower-connecting portion 111 is a portion of which a front end is connected to the blower 70, and extends in the front-rear direction.

The second portion 112 extends from a rear end of the blower-connecting portion 111 obliquely in a laterally-outward-and-rearward direction.

The third portion 113 extends from a rear end of the second portion 112 rearward.

In the present embodiment, the second portion 112 has a dimension in the lateral direction (i.e., width) increasing gradually with increasing distance from the position of the rear end of the blower-connecting portion 111 rearward, and the third portion 113 has a dimension in the lateral direction greater than that of the blower-connecting portion 111.

As shown in FIG. 6, the cushion-connecting portion 116 is a portion connected to the air passage A1 formed in the seat cushion S1, and extends from a front end portion of the third portion 113 protrusively upward. The cushion-connecting portion 116 includes a bellows portion (indication with reference character is omitted therefor), has a flexibility, and is configured to be expandable and contractible in the vertical direction. As shown in FIG. 4, the duct D is connected to the cushion pad P1 with the cushion-connecting portion 116 routed through a U-shaped portion of the second wire member 31 next to the rightmost wire member 31 and inserted in the air passage A1 from under the cushion pad P1 which will be described below. Since the cushion-connecting portion 116 extends from the third portion 113 that is located in a position shifted to the right from the blower-connecting portion 111 (see FIG. 7), according to the present embodiment, the cushion-connecting portion 116 can be provided in such a location that it does not overlap any member, e.g., the wire member 31, located within the seat cushion S1. Accordingly, the duct D can be connected easily to the air passage A1 formed in the seat cushion S1.

Also, in the present embodiment, since the lateral dimension of the third portion 113 is greater than the lateral dimension of the blower-connecting portion 111 (see FIG. 7), the lateral dimension of the cushion-connecting portion 116 extending from the third portion 113 can be made greater. Accordingly, a sufficient cross-sectional area of the flow pass of the cushion-connecting portion 116 can be provided, so that air can be let flow between the inside of the duct D and the air passage A1 formed in the seat cushion S1.

As shown in FIG. 7, the fourth portion 114 extends from a rear end of the third portion 113 obliquely in a laterally-outward-and-rearward direction.

The wider portion 115 extends from a rear end of the fourth portion 114 rearward. As shown in FIG. 6, the wider portion 115 is configured to have a dimension D11 in the lateral direction greater than a dimension D12 thereof in the vertical direction. In other words, the wider portion 115 has a vertically thin and flattened shape in cross section. Also, in the present embodiment, not only the wider portion 115 but also the lower tubular portion 110 as a whole has a vertically thin and flattened shape in cross section. The lower tubular portion 110 including the wider portion 115, which is located under the seat cushion S1, is small in the vertical dimension, and thus can be made thinner in the vertical direction. Therefore, the car seat S can be made compact in the vertical direction.

Referring back to FIG. 7, the wider portion 115 is located under the supporting member 30 in a position closer to one of the cushion side frames 11, specifically, to the right cushion side frame 11, than to a laterally central position (see alternate long and short dashed lines) between the pair of cushion side frames 11. In other words, the wider portion 115 is located near the right cushion side frame 11. Even though a load received by the supporting member 30 from an occupant would cause the center portion of the seat cushion S1 to sag down more greatly than the left and right side portions of the seat cushion S1, location of the wider portion 115 thus shifted to the right makes it possible to restrain interference between the duct D and the supporting member 30.

As shown in FIG. 2, in the present embodiment, the fourth portion 114 and the wider portion 115 form a lower inclined portion 180. The lower inclined portion 180 extends obliquely in a rearward-and-downward direction, as viewed from the left or right side. Accordingly, even when an occupant gets seated on the seat and causes the supporting portion 30 to sag down, interference between the duct D and the supporting member 30 can be restrained.

The first narrower portion 131 and the second narrower portion 132 are portions located rearward of the cushion frame F1, and extend approximately in the vertical direction. The second narrower portion 132 has inside dimensions in the front-rear direction and in the lateral direction slightly greater than outside dimensions of the first narrower portion 131 in the front-rear direction and in the lateral direction, and is fitted on an upper end portion of the first narrower portion 131. In this way, the first duct D1 and the second duct D2 are connected. As shown in FIG. 6, the first narrower portion 131 and the second narrower portion 132 are configured to have a dimension D21 in the lateral direction smaller than a dimension D22 thereof approximately in the front-rear direction that is perpendicular to the lateral direction. In other words, the first narrower portion 131 and the second narrower portion 132 have laterally thin and flattened shapes in cross section. In the present embodiment, not only the narrower portions 131, 132 but also the bellows portion 140 has a laterally thin and flattened shape in cross section.

The connecting portion 120 is a portion connecting the first narrower portion 131 (narrower portion) and the wider portion 115. The connecting portion 120 has a dimension in the lateral direction increasing gradually with increasing distance from the first narrower portion 131 toward the wider portion 115, and a dimension in the vertical direction decreasing gradually with increasing distance from the first narrower portion 131 toward the wider portion 115. With this configuration, the cross-sectional shape of the duct D gradually changes from the first narrower portion 131 toward the wider portion 115, and thus the rigidity of the duct D can be increased more effectively in comparison with an alternative configuration in which the cross-sectional shape does not change. Moreover, since an undesirable shrinkage of the cross-sectional area of the flow pass inside the connecting portion 120 of the duct D can be restrained, a sufficient amount of flow of air flowing through the duct D can be ensured.

The bellows portion 140 extends from an upper end of the second narrower portion 132 approximately upward. The bellows portion 140, having a shape pleated with alternate ridges and furrows, is configured to have flexibility and to be expandable and contractible. As shown in FIG. 2, the bellows portion 140 is located rearward of the cushion frame F1, to be more specific, rearward of the rear pipe 13. To elaborate, the bellows portion 140 is located above a lower end 13A of the rear pipe 13. In addition, the bellows portion 140 has an upper end located directly rearward of the lower frame 24, in other words, so located as to overlap the lower frame 24 as viewed from the rear side.

Figure 8:
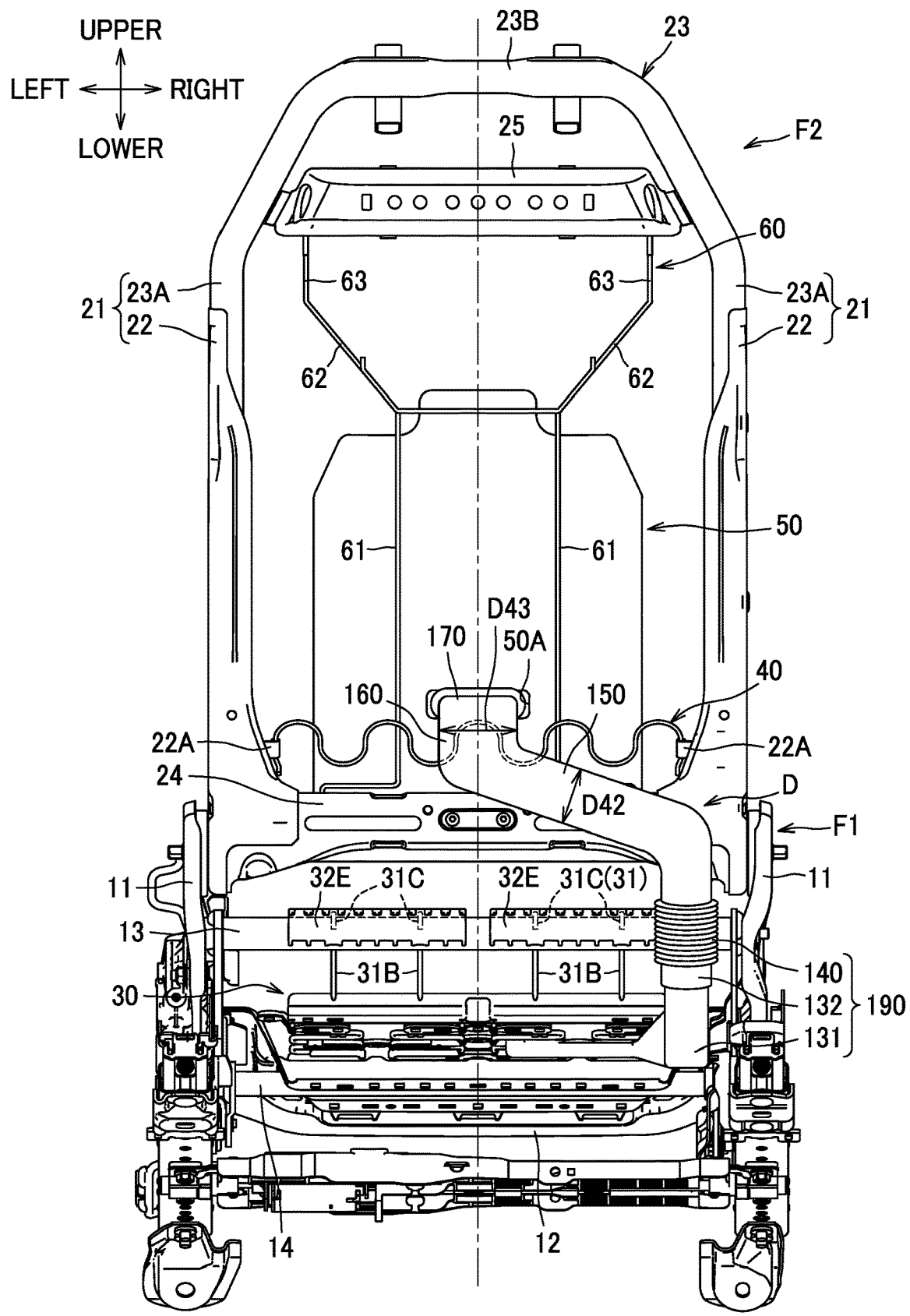
FIG. 8 is a view of a back frame, a pressure-receiving member and a duct as viewed from the rear.

In the present embodiment, the first narrower portion 131, the second narrower portion 132, and the bellows portion 140 form a retreated portion 190. The retreated portion 190 extends obliquely in a downward-and-frontward direction. As shown in FIG. 8, the retreated portion 190 is located in a position laterally inward of the pair of cushion side frames 11. Accordingly, the car seat S can be made more compact in lateral dimension in comparison with an alternative configuration in which the retreated portion 190 is located in a position laterally outward of the pair of cushion side frames 11. Moreover, the retreated portion 190 is located, at the rear side of the cushion frame F1, in a position closer to the right cushion side frame 11 (i.e., one of the cushion side frames 11) than to a laterally central position (see alternate long and short dashed lines) between the pair of cushion side frames 11. In other words, the retreated portion 190 is located near the right cushion side frame 11.

The retreated portion 190, that is, a portion of the duct D which is located at the rear side of the rear pipe 13, is located in a position different in the lateral direction from positions of the rear hook portions 31C of the wire members 31. To be more specific, the retreated portion 190 is located at the right side of the rightmost rear hook portion 31C. The duct D is located in a position that is also different in the lateral direction from positions of the second extension portions 31B of the wire members 31 as viewed from the rear side. To be more specific, the retreated portion 190 and the wider portion 115 (see FIG. 7) are located at the right side of the rightmost second extension portion 31B as viewed from the rear side. To elaborate, in the present embodiment, the retreated portion 190 and the wider portion 115 are so located as not to overlap the second extension portions 31B as viewed from any directions, i.e., from the front, rear, left and right sides as well as from above and from below. With this configuration, even when an occupant gets seated on the seat and causes the wire members 31 (supporting portion 30) to sag down, interference between the duct D and the wire members 31 can be restrained.

The first flat portion 150 extends from an upper end of the retreated portion 190 (bellows portion 140) obliquely upward toward a laterally central position between the pair of back side frames 21. The first flat portion 150 is located at a rear side of the lower frame 24. As shown in FIG. 6, the first flat portion 150 has a dimension D41 in the front-rear direction (in an opposed direction in which the first flat portion 150 is opposed to the lower frame 24) that is smaller than a dimension D42 thereof in an approximately vertical direction that is perpendicular to the front-rear direction. In other words, the first flat portion 150 has a thin cross-sectional shape and flattened in the front-rear direction. With this configuration, in which the first flat portion 150 can be made thinner in the front-rear direction, the car seat S can be made compact in the front-rear direction. Besides the compactness achieved, a sufficient clearance can be left between the first flat portion 150 and the lower frame 24, so that interference between the duct D and the lower frame 24 can be restrained.

Referring back to FIG. 8, the second flat portion 160 extends from an upper end of the first flat portion 150 upward. The second flat portion 160 is disposed at a rear side of the S spring 40 in a laterally central position between the pair of back side frames 21. In the present embodiment, the second flat portion 160 and the first flat portion 150 have approximately the same dimension in the front-rear direction. The second flat portion 160 has a dimension D41 (see FIG. 6) in the front-rear direction (in an opposed direction in which the second flat portion 160 is opposed to the S spring 40) that is smaller than a dimension D43 thereof in the lateral direction perpendicular to the front-rear direction. In other words, the second flat portion 160 has a thin cross-sectional shape flattened in the front-rear direction. With this configuration, in which the second flat portion 160 can be made thinner in the front-rear direction, the car seat S can be made compact in the front-rear direction. Besides the compactness achieved, a sufficient clearance can be left between the second flat portion 160 and the S spring 40, so that interference between the duct D and the S spring 40 can be restrained.

As shown in FIG. 2, the back-connecting portion 170 is a portion to be connected to the air passage A2 formed in the seat back S2, and extends from an upper end of the second flat portion 160 obliquely in a front-and-upward direction. The duct D is connected to the back pad P2 which will be described later, with the back-connecting portion 170 being disposed through the opening 50A formed in the pressure-receiving member 50, and inserted from the rear side of the back pad P2 in the air passage A2.

As shown in FIG. 4, a known weight sensor WS as an example of a sensor is disposed under one of the pair of cushion side frames 11, specifically, under the left cushion side frame 11. In the present embodiment, the duct D is, in the lateral direction, located closer to another of the pair of cushion side frames 11 (i.e., the right cushion side frame 11) than to the one of the pair of cushion side frames 11 (i.e., the left cushion side frame 11). In other words, the duct D is, in the lateral direction, located closer to the cushion side frame 11 at which the weight sensor WS is not disposed. Accordingly, interference between the duct D and the weight sensor WS, electric wires (not shown) extending from the weight sensor WS or other members can be restrained.

The plastic member 32 constituting the supporting member 30 is located to overlap the duct D as viewed from above. To be more specific, the first plastic member 32A has a right-side portion so located above the third portion 113 of the duct D as to overlap the third portion 113 as viewed from above. Also, the right third plastic member 32C is so located above the wider portion 115 of the duct D as to overlap the wider portion 115 as viewed from above.

Furthermore, the fourth plastic member 32D has a right end portion so located above the wider portion 115 as to overlap the wider portion 115 as viewed from above. With these configurations, even when an occupant gets seated on the seat and causes the supporting portion 30 to sag down and interfere with the duct D, the plastic members 32A, 32C, 32D first come in contact with the duct D, so that detrimental effects which would be caused by the contact of the supporting member 30 with the duct D, for example, noises produced and/or shock given upon the contact, etc., can be reduced.

As shown in FIG. 7, in the present embodiment, the lower tubular portion 110 is so provided as to have its second portion 112 extending obliquely in a rightward-and-rearward direction toward the right cushion side frame 11, its third portion 113 extending approximately straight rearward, and the following fourth portion 114 extending obliquely in a rightward-and-rearward direction, i.e., further angled toward the right cushion side frame 11, so that the duct D can be so located as to gradually change its course toward the right cushion side frame 11. With this configuration, an abrupt change in the flow pass formed inside the duct D can be restrained, so that air can be let flow through the duct fluently.

Figure 9:
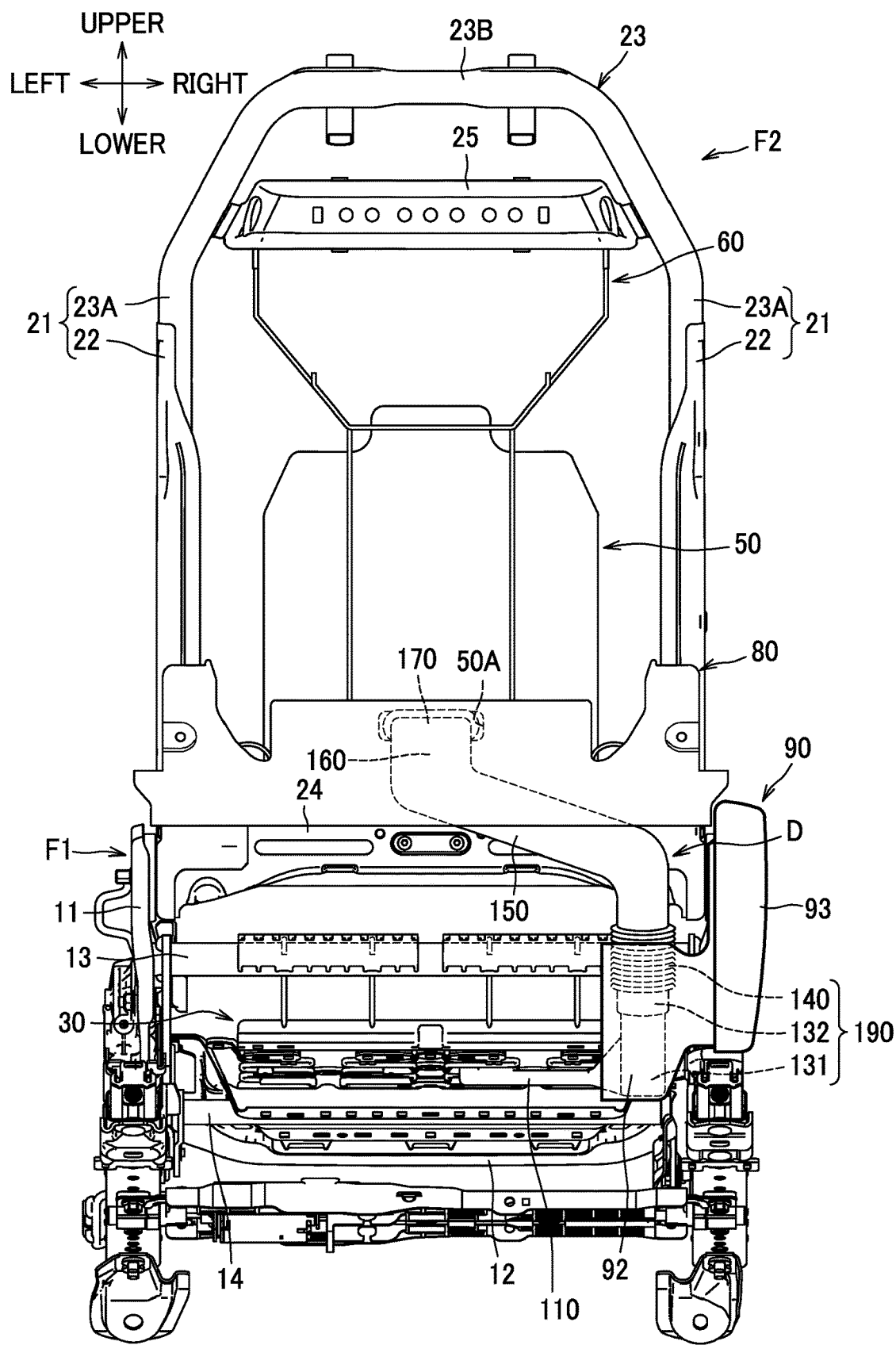
FIG. 9 is a view of a back frame to which a cover member is attached, as viewed from the rear.

As shown in FIG. 9, a cover member 80 is disposed at the back frame F2. The cover member 80 is a member configured to cover, from the rear side, the back-connecting portion 170 that is a portion of the duct D to be connected to the air passage A2 of the seat back S2. The cover member 80 is formed of plastic or the like in a shape of a laterally elongate plate. The cover member 80 has its left and right end portions fastened with bolts or otherwise fixed to laterally inwardly extending portions at rear ends of the pair of back side frames 21, and is mounted thereto accordingly. Provision of such a cover member 80 makes it possible to protect a portion at which the duct D and the pad P of the seat back S2 (back pad P2) are connected.

Figure 10:
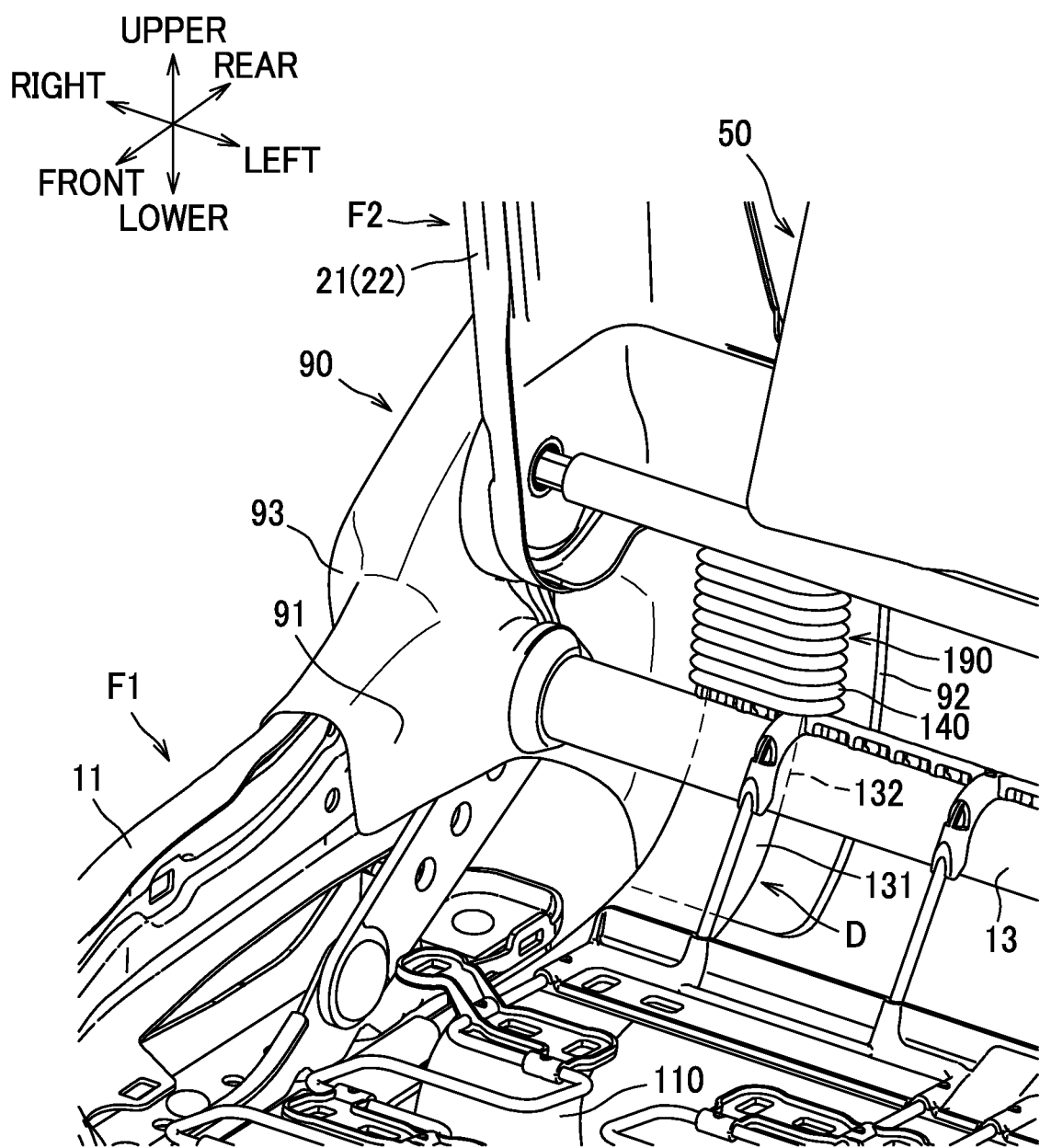
FIG. 10 is a perspective view of a side frame cover as viewed from a laterally inner side.
Figure 11:
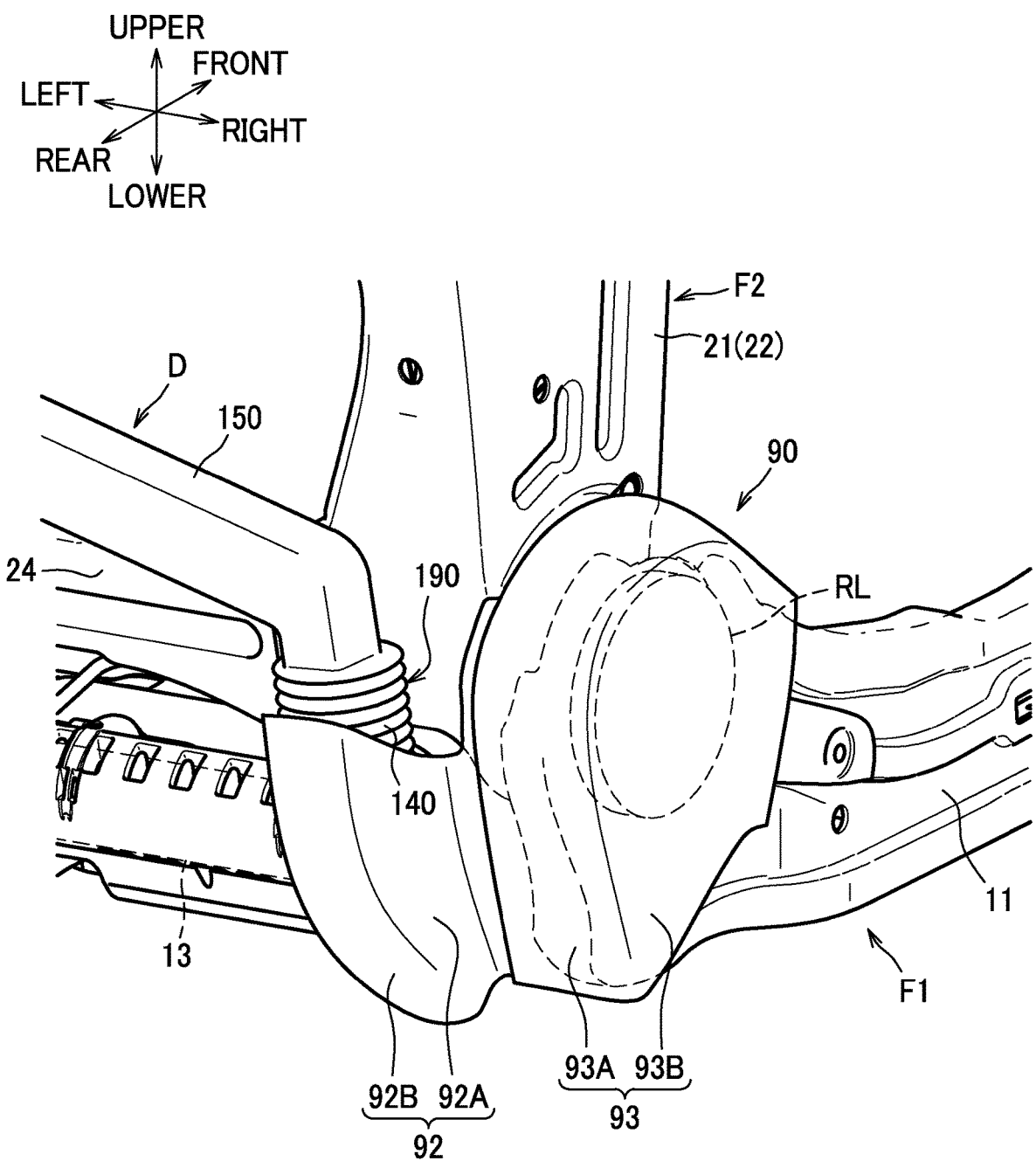
FIG. 11 is a perspective view of a side frame cover as viewed from a laterally outer side.

As shown in FIG. 10 and FIG. 11, the car seat S further includes a side frame cover 90. The side frame cover 90 is a member configured to cover a rear end portion of the right cushion side frame 11. The side frame cover 90 is made of plastic, and includes a side frame cover portion 91, a duct cover portion 92, and a reclining mechanism cover portion 93.

The side frame cover portion 91 is a portion configured to cover a laterally inner side of a rear end portion of the right cushion side frame 11. The side frame cover portion 91 is located over front, lower and rear sides of a lower end portion of the back side frame 21.

The duct cover portion 92 is a portion provided rearward of the cushion frame F1 and configured to cover the retreated portion 190 that is part of the duct D. To be more specific, the duct cover portion 92 is disposed rearward of the rear pipe 13, and covers the first narrower portion 131, the second narrower portion 132, and the bellows portion 140. The duct cover portion 92 includes a first side cover portion 92A extending from a rear end of the side frame cover portion 91 rearward up to a position rearward of the retreated portion 190, and a rear cover portion 92B extending from a rear end of the first side cover portion 92A laterally inward to cover the retreated portion 190 from the rear side. The rear cover portion 92B has a cross-sectional shape of an arc jutting in an obliquely-rearward-and-downward direction, and extends along the retreated portion 190 in a downward-and-frontward direction.

The reclining mechanism cover portion 93 is a portion configured to cover the reclining mechanism RL, and is formed approximately in a shape of a cup that opens on the laterally inner side and the bottom side. The reclining mechanism cover portion 93 is formed to extend from the side frame cover portion 91 along the peripheral surface of the reclining mechanism RL, and mainly includes a peripheral surface cover portion 93A configured to cover rear, upper and front sides of the reclining mechanism RL, and a second side cover portion 93B configured to cover a laterally outer side of the reclining mechanism RL.

The side frame cover portion 91, the duct cover portion 92, and the reclining mechanism cover portion 93 may be a portion which is formed integrally in one piece or may be a portion part of which is formed separately from others. To illustrate by example, the duct cover portion 92 may be configured to be formed integrally with the side frame cover portion 91, while the reclining mechanism cover portion 93 formed separately from the side frame cover portion 91 is provided with a claw engageable in a hole provided at a rear end portion of the side frame cover portion 91 whereby the reclining mechanism cover portion 93 is attached to the side frame cover portion 91.

Since the duct cover portion 92 and the side frame cover portion 91 are provided integrally in one piece, the necessity of providing a cover for the cushion side frame 11 and a cover for the duct D individually is obviated, so that the number of parts for the car seat S can be reduced. Moreover, in cases where the side frame cover portion 91, the duct cover portion 92 and the reclining mechanism cover portion 93 are provided integrally in one piece, the side frame cover 90 may not only serve to protect the duct D but also serve to protect the reclining mechanism RL, so that the number of parts for the car seat S can be reduced more.

As shown in FIG. 2, the pad P includes a cushion pad P1 constituting a pad for the seat cushion S1 and a back pad P2 constituting a pad for the seat back S2.

As shown in FIG. 1, the cushion pad P1 includes a center portion P11 and a pair of left and right side portions P12 provided at left and right sides of the center portion P11, and bulging upward farther than the center portion P11; the back pad P2 includes a center portion P21 and a pair of left and right side portions P22 provided at left and right sides of the center portion P21, and bulging frontward farther than the center portion P21.

Figure 12:
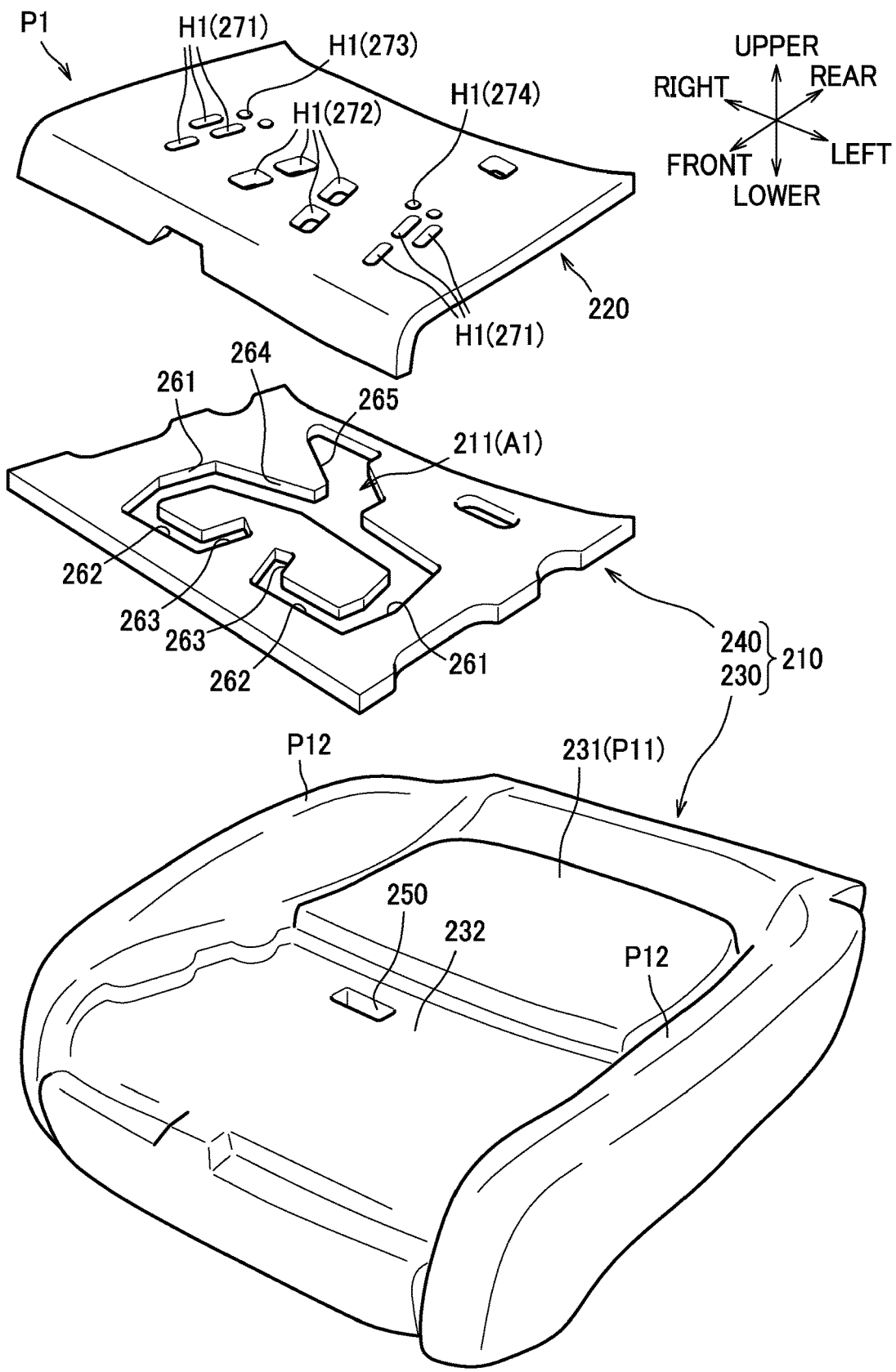
FIG. 12 is a view showing a configuration of a cushion pad.

As shown in FIG. 12, the cushion pad P1 is configured to include a first member 210 having formed therein a groove 211 constituting the air passage A1, and a plate-shaped second member 220 having formed therein the first ventilation hole H1 piercing through upper and lower sides thereof. The first member 210 includes a first member body 230 and a plate-shaped groove-forming member 240 having a slot 211 piercing through upper and lower sides thereof. The groove-forming member 240 is laid on an upper surface of the first member body 230, and the second member 220 is laid on an upper surface of the groove-forming member 240 (first member 210).

Figure 13:
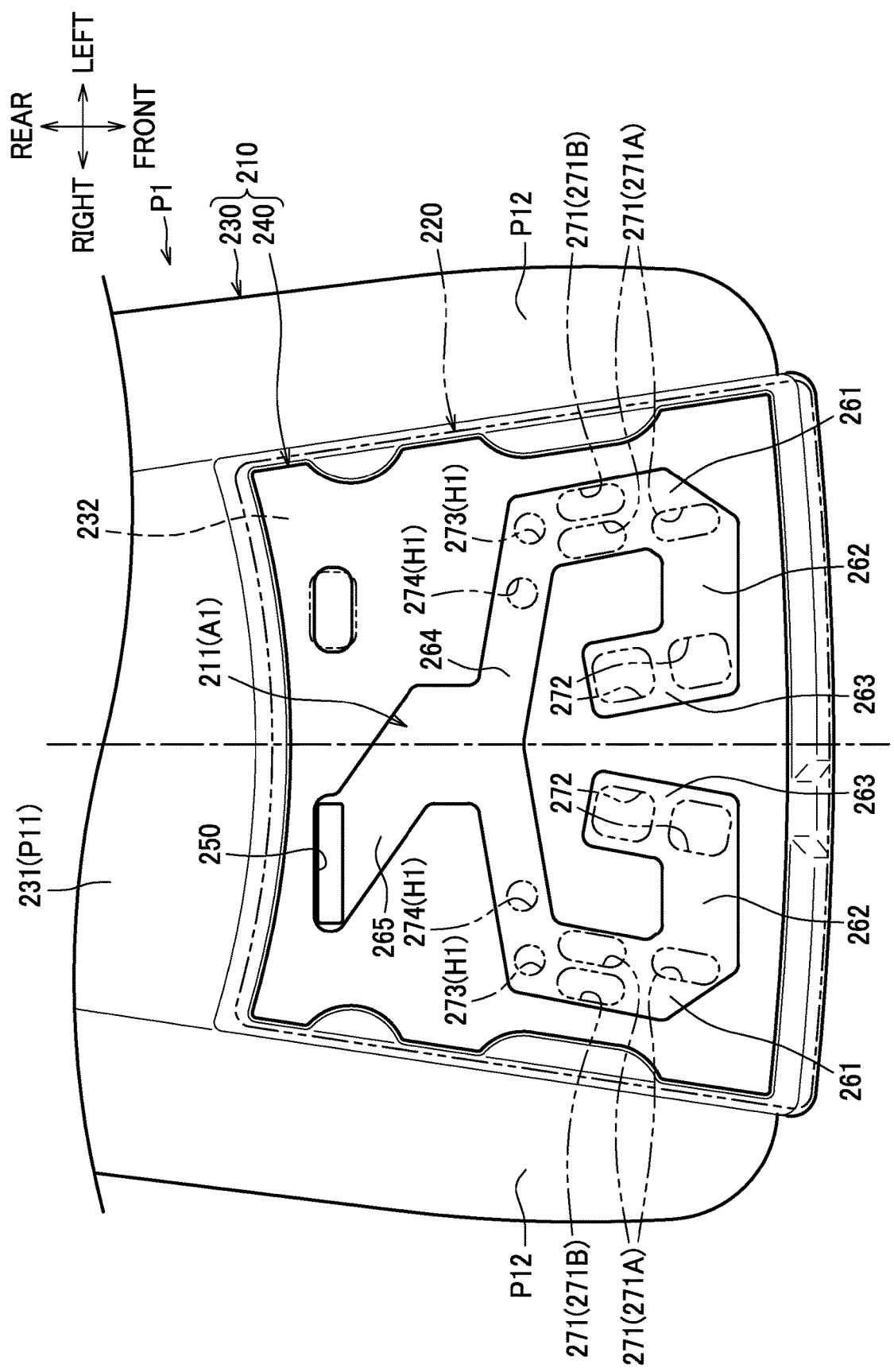
FIG. 13 is a view of a cushion pad as viewed from above.

The first member body 230 includes a body center portion 231 which, together with the groove-forming member 240 and the second member 220, constitutes the center portion P11, and the pair of side portions P12 are formed at the left and right sides of the body center portion 231. The body center portion 231 includes, at a front side thereof, a recessed portion 232 on which the groove-forming member 240 and the second member 220 are laid. A rear end portion of a bottom surface of the recessed portion 232 has formed therein a second ventilation hole 250 piercing through upper and lower sides thereof. The second ventilation hole 250 extends from an undersurface of the first member body 230 (cushion pad P1) and is connected to the air passage A1. The duct D is connected to the cushion pad P1 with the cushion-connecting portion 116 (see FIG. 6) inserted in the second ventilation hole 250 from below. As shown in FIG. 13, the second ventilation hole 250 is located in a position shifted from the laterally central position (see alternate long and short dashed lines) of the cushion pad P1.

The groove-forming member 240 includes a slot 211 piercing through upper and lower sides thereof to form the air passage A1. The air passage A1 of the cushion pad P1 is formed with the groove-forming member 240 and the second member 220 laid in this order on the recessed portion 232 of the first member body 230 such that the upper and lower sides of the slot 211 are covered by the second member 220 and the first member body 230. The air passage A1 as viewed from above includes first air passages 261, second air passages 262, third air passages 263, a fourth air passage 264, and a fifth air passage 265.

Each first air passage 261 extends in a direction nonparallel to the lateral direction, specifically, approximately in the front-rear direction. The first air passage 261 has one end (i.e., rear end) connected via the fourth air passage 264, the fifth air passage 265, the second ventilation hole 250, and the duct D, to the blower 70.

Each second air passage 262 extends from another end (i.e., front end) of the first air passage 261 in a direction (specifically, laterally inward direction) that is different from a direction of extension of the first air passage 261.

Each third air passage 263 extends from a laterally inner end (i.e., an end opposite to an end to which the first air passage 261 is connected) of the second air passage 262 in a direction (specifically, a direction in which the first air passage 261 extends toward its rear end, i.e., approximately parallel to the first air passage 261) that is nonparallel to the lateral direction.

In the present embodiment, two approximately U-shaped flow passages each consisting of the first air passage 261, the second air passage 262 and the third air passage 263 are formed bisymmetrically with respect to a laterally central position of the cushion pad P1 at a left side and at a right side. With this configuration, an occupant can be supported in good balance by portions of the cushion pad P1 which have no air passage A1 formed therein; therefore, even if the air passage A1 includes the first air passage 261, the second air passage 262 and the third air passage 263, an increased ride comfort can be provided for the occupant seated on the seat.

The fourth air passage 264 is a flow passage connecting rear ends of the left and right first air passages 261, and extends approximately in the lateral direction.

The fifth air passage 265 is a flow passage connecting the second ventilation hole 250 and the fourth air flow passage 264, and extends approximately in the front-rear direction. To be more specific, the fifth air passage 265 extends, from the second ventilation hole 250 located in a position shifted from the laterally central position of the cushion pad P1 to the right, obliquely in a frontward-and-laterally-inward direction toward the laterally central position of the cushion pad P1, and is connected to a laterally central portion of the fourth air passage 264.

The groove-forming member 240 is bonded with an adhesive or otherwise fixed to the first member body 230.

The second member 220 has a plurality of first ventilation holes H1 connected to the air passage A1. The first ventilation holes H1 of the cushion pad P1 includes first holes 271, second holes 272, third holes 273, and fourth holes 274.

The first holes 271 are holes connected to the first air passages 261; a plurality of the first holes 271 are formed along each first air passage 261 extending approximately in the front-rear direction. To be more specific, the first holes 271 include two first holes 271A arranged approximately in front and in rear along each first air passage 261, and one first hole 271B arranged at a laterally outer side of the first hole 271A in the rear.

The second holes 272 are holes connected to the third air passages 263; a plurality of the second holes 272 are formed along each third air passage 263 extending approximately in the front-rear direction. To be more specific, the second holes 272 include two second holes 272 arranged approximately in front and in rear along each third air passage 263.

A row of the first holes 271A arranged in front and in rear and a row of the second holes 272 arranged in front and in rear are arranged side by side with each other in a direction of extension of the second air passage 262, specifically in the lateral direction.

The third holes 273 are holes connected to rear end portions of the first air passages 261, and the fourth holes 274 are holes connected to left and right end portions of the fourth air passage 264.

The second member 220 is bonded with an adhesive or otherwise fixed to the groove-forming member 240 and the first member body 230 (first member 210).

As shown in FIG. 4, when the cushion pad P1 is laid over the cushion frame F1, the front pipe 14 is located under the cushion pad P1. In this state, the front pipe 14 is located in a position different from positions of the first air passages 261, the second air passages 262 and the third air passages 263 as viewed from above. To be more specific, the front pipe 14 is located rearward of the first air passages 261, the second air passages 262 and the third air passages 263 as viewed from above.

When the cushion pad P1 is laid over the cushion frame F1, the pan frame 12 is located under a front end portion of the cushion pad P1, and configured to support the cushion pad P1 from below. In this state, the pan frame 12 is so located as to overlap the first air passages 261, the second air passages 262 and the third air passages 263 as viewed from above. In other words, the pan frame 12 is located under portions in which the first air passages 261, the second air passages 262 and the third air passages 263 are formed. In the present embodiment, the pan frame corresponds to "pad supporting member". Although the portions of the cushion pad P1 which have the air passages 261-263 formed therein are more likely to deform in comparison with portions having no air passage formed therein, the present embodiment according to which the portions having the air passages 261-263 formed therein can be supported by the pan frame 12 makes it possible to restrain excessive deformation of the cushion pad P1. In particular, according to the present embodiment, the easily deformable portions having the air passages 262-263 formed therein can be supported by the plate-shaped pan frame 12; therefore, an excessive deformation of the cushion pad P1 can be restrained more effectively.

Figure 14:
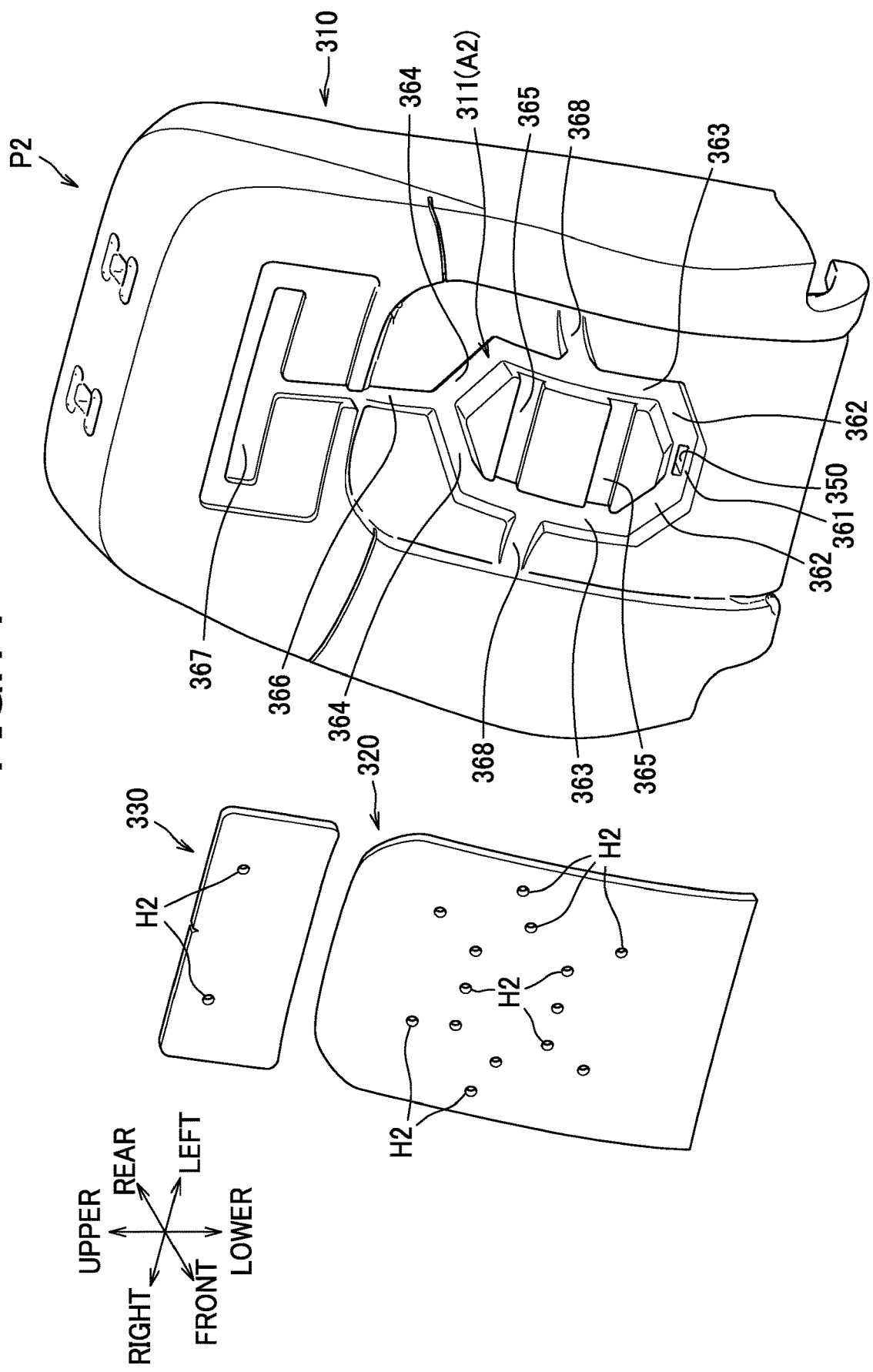
FIG. 14 is a view showing a configuration of a back pad.

As shown in FIG. 14, the back pad P2 is configured to include a first member 310 having formed therein a groove 311 constituting the air passage A2, and the second member 320 and the third member 330 each of which is in a shape of a plate having first ventilation holes H2 piercing front and rear sides thereof. The second member 320 and the third member 330 are laid on a front surface of the first member 310. In the present embodiment, the back pad P2 corresponds to "a pad member configured to cover an occupant side of the pressure receiving member".

The first member 310 has a groove 311 in a shape of a depression having a bottom recessed rearward, and a second ventilation hole 350 piercing front and rear sides thereof.

The air passage A2 of the back pad P2 is formed with the second member 320 and the third member 330 laid on the front side of the first member 310 such that the front side of the groove 311 is covered by the second member 320 and the third member 330. The air passage A2 includes a first passage 361, a pair of second passages 362, a pair of third passages 363 (as a pair of third air passages), a pair of fourth passages 364 and two fifth passages 365 (as a fourth air passage), a sixth passage 366, a seventh passage 367, and a pair of branch passages 368 (as a first air passage).

The first passage 361, the second passages 362, the third passages 363, the fourth passages 364, and the fifth passages 365 are formed in the center portion P21, at or around its center in the vertical direction.

The first passage 361 extends in the lateral direction. The second ventilation hole 350 extends from a rear surface of the first member 310 (back pad P2) and is connected to the first passage 361 constituting the air passage A2. The duct D has its back-connecting portion 170 (see FIG. 6) inserted in the second ventilation hole 350 from the rear side, and is thereby connected to the back pad P2.

The second passages 362 extend from left and right ends of the first passage 361 obliquely in laterally-outward-and-upward directions.

The third passages 363 extend from upper ends of the second passages 362 in the vertical direction (perpendicular directions perpendicular to the lateral direction), specifically, upward. The pair of third passages 363 are arranged side by side with each other in the lateral direction.

The fourth passages 364 extend from upper ends of the third passage 363 obliquely in laterally-inward-and-upward directions, and have their upper ends connected to each other. In other words, the pair of fourth passages 364 connect the upper ends of the pair of third passages 363.

The fifth passages 365 are located at laterally inner sides of the pair of third passages 363, and extend laterally to connect the pair of third passages 363. The two fifth passages 365 are arranged side by side one above the other. The first passage 361, the second passages 362, the third passages 363 and the fourth passages 364 have approximately the same dimension in the front-rear direction (depths) of the grooves, while the fifth passages 565 have a dimension in the front-rear direction of the grooves smaller (i.e., shallower) than the dimension of the first, second, third and fourth passages.

The sixth passage 366 and the seventh passage 367 are formed in an upper portion of the center portion P21.

The seventh passage 367 extends in the lateral direction.

The sixth passage 366 is a flow passage connecting upper ends of the pair of fourth passages 364 to a laterally central position of the seventh passage 367, and extends approximately in the vertical direction.

Figure 15:
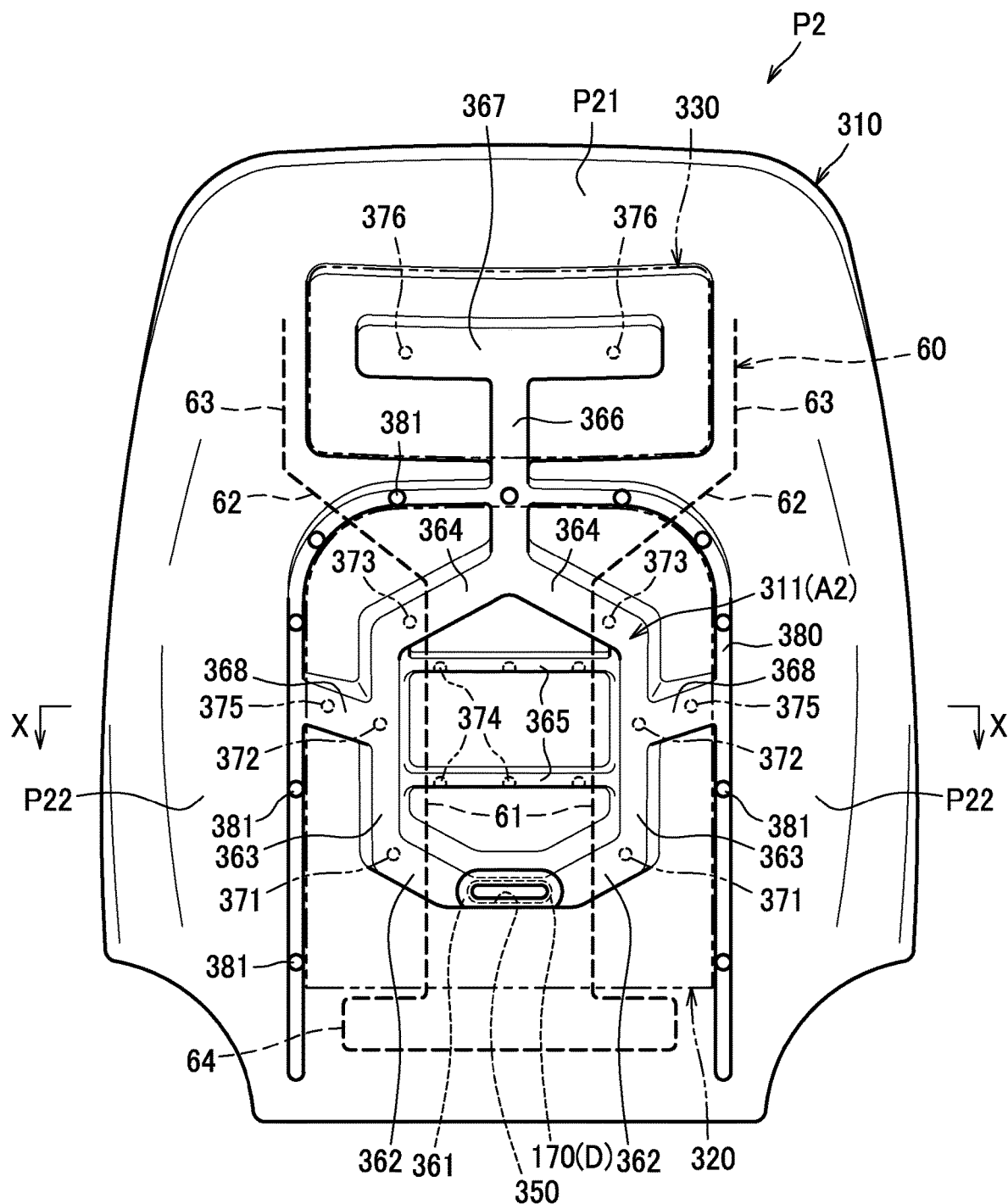
FIG. 15 is a view of a back pad as viewed from the front.

The branch passages 368 extend from vicinities of vertically central positions of the third passages 363 along the front surface of the back pad P2 laterally outward. To be more specific, as shown in FIG. 15, each branch passage 368 extends obliquely, with respect to the vertical direction, deviating in an upward direction (in another of perpendicular directions) increasingly with increasing distance from the vicinity of the vertically central position of the third passage 363 toward a laterally outer end of the back pad P2. In other words, the branch passage 368 extends from the vicinity of the vertically central position of the third passage 363 obliquely in a laterally-outward-and-upward direction. In the present embodiment, portions of the third passages 363 extending from their positions of connection to the branch passages 368 downward (in one of perpendicular directions), as well as the second passages 362 and the first passage 361 correspond to "second air passage" connecting the branch passages 368 to the second ventilation hole 350.

The second member 320 and the third member 330 have a plurality of first ventilation holes H2 (see FIG. 14) connected to the air passage A2. The first ventilation holes H2 of the back pad P2 include first holes 371, second holes 372, third holes 373, fourth holes 374, and fifth holes 375 formed in the second member 320, and sixth holes 376 formed in the third member 330.

The first holes 371 are holes connected to the passage near lower ends of the third passages 363.

The second holes 372 are holes connected to the passage near the vertically central positions of the third passages 363, in other words, to the positions to which the branch passages 368 of the third passage 363 are connected.

The third holes 373 are holes connected to the passage near lower ends of the fourth passages 364.

The fourth holes 374 are holes connected to the fifth passages 365; the total six holes are formed one in each of the positions facing the center and the vicinities of both end portions in the lateral direction of each fifth passage 365.

The fifth holes 375 are holes connected to the branch passages 368. The fifth holes 375 are located at end portions of the center portion P21 in the lateral direction, specifically, the left and right end portions of the second member 320.

The sixth holes 376 are holes connected to the seventh passage 367, and are formed one in each of the positions facing the left and right end portions of the seventh passage 367.

The back pad P2 has an approximately U-shaped tuck-in groove 380 at left and right sides and upper side (facing in one of the directions perpendicular to the lateral direction) of the second member 320 as a ventilation hole-forming portion. In the back pad P2, a tuck-in wire (not shown) for use in tucking the outer covering U2 (see FIG. 16) in the tuck-in groove 380 is embedded along the tuck-in groove 380 by insert molding, which tuck-in wire is partially exposed at a plurality of holes 381 formed at the bottom of the tuck-in groove 380. The outer covering U2 of the seat back S2 is anchored to the back pad P2 with hooks or the like provided on the outer covering U2 being engaged with exposed portions of the tuck-in wire through the holes 381.

Figure 16:
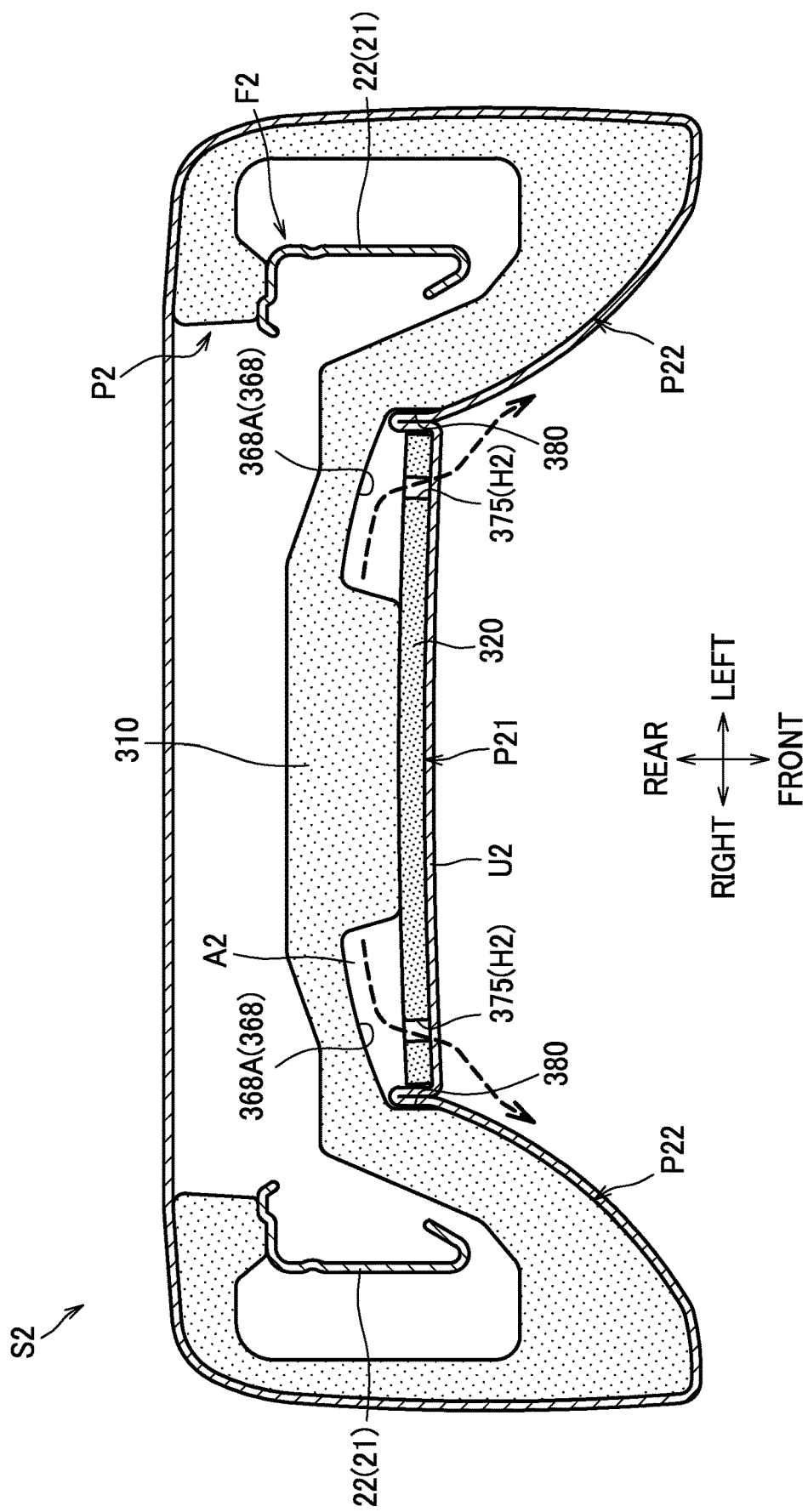
FIG. 16 is an X-X section view of FIG. 15.

As shown in FIG. 16, each branch passage 368 has one end, i.e., a laterally outer end, that is closed with the outer covering U2 tucked in the tuck-in groove 380. The branch passage 368 has an opposed surface 368A facing to the fifth hole 375. The opposed surface 368A is located at a laterally outer end portion of the branch passage 368. To be more specific, the opposed surface 368A is located in a position, closer to a laterally outer end position than to a laterally central position, of the branch passage 368. The opposed surface 368A extending toward an edge (specifically, the laterally outer edge) of the back pad P2 as viewed from the front side is angled in an oblique direction toward the front side. The opposed surface 368A is formed in the first member 310.

The second member 320 and the third member 330 (see FIG. 14) are bonded with an adhesive or otherwise fixed to the first member 310.

Referring back to FIG. 15, the air passage A2 is so located as to cross the wire member 60 as viewed from the front side. To be more specific, the obliquely extending second and fourth passages 362, 364 are so located as to cross the extension portions 61 of the wire member 60 as viewed from the front side. The fifth passages 365 are so located as to have their left and right end portions crossing the extension portions 61. On the other hand, the first passage 361 and the third passages 363 are located in positions different from the positions of the extension portions 61 as viewed from the front side. To be more specific, the first passage 361 is located in a position laterally inward of the extension portions 61, and the third passages 363 are located in positions laterally outward of the extension portions 61. The sixth passage 366 is located in a position laterally inward of the inclined portions 62 and lower portions of the upper connecting portions 63 of the wire member 60, and the seventh passage 367 is located in a position laterally inward of upper portions of the upper connecting portions 63.

Since the cushion pad P1 and the back pad P2 are configured to include the first members 210, 310 having the air passages A1, A2 formed therein, and the second members 220, 320 having the ventilation holes H1, H2 formed therein, the pad P can be formed with increased ease in comparison with an alternative configuration in which a pad including the air passages A1, A2 and the first ventilation holes H1, H2 is formed integrally in one piece. To elaborate, the cushion pad P1 having formed therein the air passage A1 including the air passages 261-263, and the back pad P2 including the air passage A2 having the obliquely extending opposed surfaces 368A formed therein can be formed easily. Moreover, since the cushion pad P1 includes the first member 210 constructed of the first member body 230 and the groove-forming member 240, the first member 210 with the air passage A1 having a complicate shape including the air passages 261-263 can be formed easily. In this way, the cushion pad P1 can be formed with increased ease.

According to the present embodiment as described above, the duct D (retreated portion 190) can be protected at the rear side of the seat cushion S1 by the duct cover portion 92 of the side frame cover 90 as shown in FIG. 2, the duct D can be made unlikely be hit by a foot of an occupant seated on a rear seat.

Since the duct cover portion 92 is provided to cover the bellows portion 140, the bellows portion 140 that is a soft portion of the duct D can be made unlikely be hit by a foot of an occupant seated on a rear seat.

Since the bellows portion 140 is located above the lower end 13A of the rear pipe 13, the bellows portion 140 of the duct D can be made more unlikely to be hit by a foot of an occupant seated on a rear seat effectively in comparison with an alternative configuration in which the bellows portion is located below the lower end 13A of the rear pipe 13.

Since the narrower portion 131, 132 has a smaller dimension in the lateral direction (i.e., width), the narrower portion 131, 132 of the duct D can be made unlikely to be hit by a foot of an occupant seated on a rear seat. Moreover, since the narrower portion 131, 132 has a smaller dimension in the lateral direction and a greater dimension approximately in the front-rear direction, and thus has a shape that is strong enough to bear a load placed from a direction approximately aligned in the front-rear direction, deformation of or other detrimental effects on the duct can be restrained effectively even if the narrower portion 131, 132 is hit by a foot of an occupant seated on the rear seat.

Furthermore, according to the present embodiment, since the retreated portion 190 of the duct D is located in a position shifted to the right cushion side frame 11 at the rear of the seat cushion S1 as shown in FIG. 8, the duct D can be made unlikely to be hit by a foot of an occupant seated on a rear seat.

Since the retreated portion 190 extends obliquely in a downward-and-frontward direction, the retreated portion 190 of the duct D is located in a position away from a foot of an occupant seated on a rear seat, at the rear of the seat cushion S1. Accordingly, the duct D can be made more unlikely to be hit by the foot of the occupant seated on the rear seat.

Furthermore, according to the present embodiment, since the back-connecting portion 170 of the duct D can be connected through the opening 50A of the pressure-receiving member 50 to the air passage A2 formed in the back pad P2, the duct D can be connected to the air passage A2 of the back pad P2 easily even in a configuration in which the car seat S includes the plate-shaped pressure-receiving member 50.

Since the opening 50A is so located as not to overlap the S spring 40 as viewed from the rear side, the back-connecting portion 170 of the duct D can be routed easily to the opening 50A of the pressure-receiving member 50. Therefore, the duct D can be connected more easily to the air passage A2 of the back pad P2.

Furthermore, according to the present embodiment, since the first ventilation holes H1 of the cushion pad P1 include first holes 271 connected to the first air passages 261, and the second holes 272 connected to the third air passages 263 as shown in FIG. 13, air can be distributed over a wide area of the surface of the seat. On the other hand, the first air passages 261, the second air passages 262 and the third air passages 263 can be formed as a continuous flow passage, so that the number of flow passages connected to the blower 70 can be reduced. Accordingly, the force of air in the air passage A1 can be restrained from being broken, so that the air can be flown fluently in the cushion pad P1.

Since the row of the first holes 271A and the row of the second holes 272 are arranged side by side with each other, the air can be distributed over a wide area of the surface of the seat, and the plurality of the first ventilation holes H1 can be arranged in a manner that permits efficient air flow.

Since the fifth air passage 265 extends from the second ventilation hole 250 in an obliquely frontward direction toward the laterally central position and is connected to the fourth air passage 264, the fifth air passage 265 connecting the second ventilation hole 250 and the fourth air passage 264 has no sharp bent. Accordingly, air can be let flow fluently from the second ventilation hole 250 through the fifth air passage 265 to the fourth air passage 264, and further through the first air passages 261, the second air passages 262 and the third air passages 263, to the first ventilation holes H1.

Furthermore, according to the present embodiment, since the opposed surface 368A of each branch passage 368 extending toward the laterally outer edge of the back pad P2 is angled in an oblique direction toward the front side as shown in FIG. 16, air to be directed to pass through the fifth ventilation holes 375 can be guided to flow along the slope provided by the opposed surface 368A. Accordingly, the air can be let flow fluently.

Since the opposed surface 368A is located over the laterally outer end portion of the branch passage 368, the slope of the opposed surface 368A can be utilized for letting the air flow more effectively in comparison with an alternative configuration in which an opposed surface is located at some midpoint along the length of the branch passage 368. Accordingly, air can be let flow more fluently.

Since the fifth holes 375 are located in the end portions of the center portion P21 in the lateral direction, when air is blown through the fifth holes 375 (see broken lines), the air forced to stream quickly along the slopes of the opposed surfaces 368 can be blown out through the fifth holes 375, to graze past the body of an occupant. Accordingly, increased coolness can be enjoyed.

Since the branch passages 368 extend obliquely in the laterally-outward-and-upward directions, away from the second ventilation hole 350, air introduced from the second ventilation hole 350 can be let flow fluently through the first passage 361 and the second passages 362, and further through the third passages 365 to the branch passages 368.

Although one embodiment of the invention has been described above, the present invention is not limited to the above-described embodiment. Specific configurations may be modified where appropriate without departing from the gist of the invention as will be described below. Hereafter, the same elements as those mentioned in relation to the above-described embodiment will be designated with the same reference characters, an explanation thereof will be omitted where appropriate, and a detailed description will be given of aspects distinct from those of the above-described embodiment.

Figure 17:
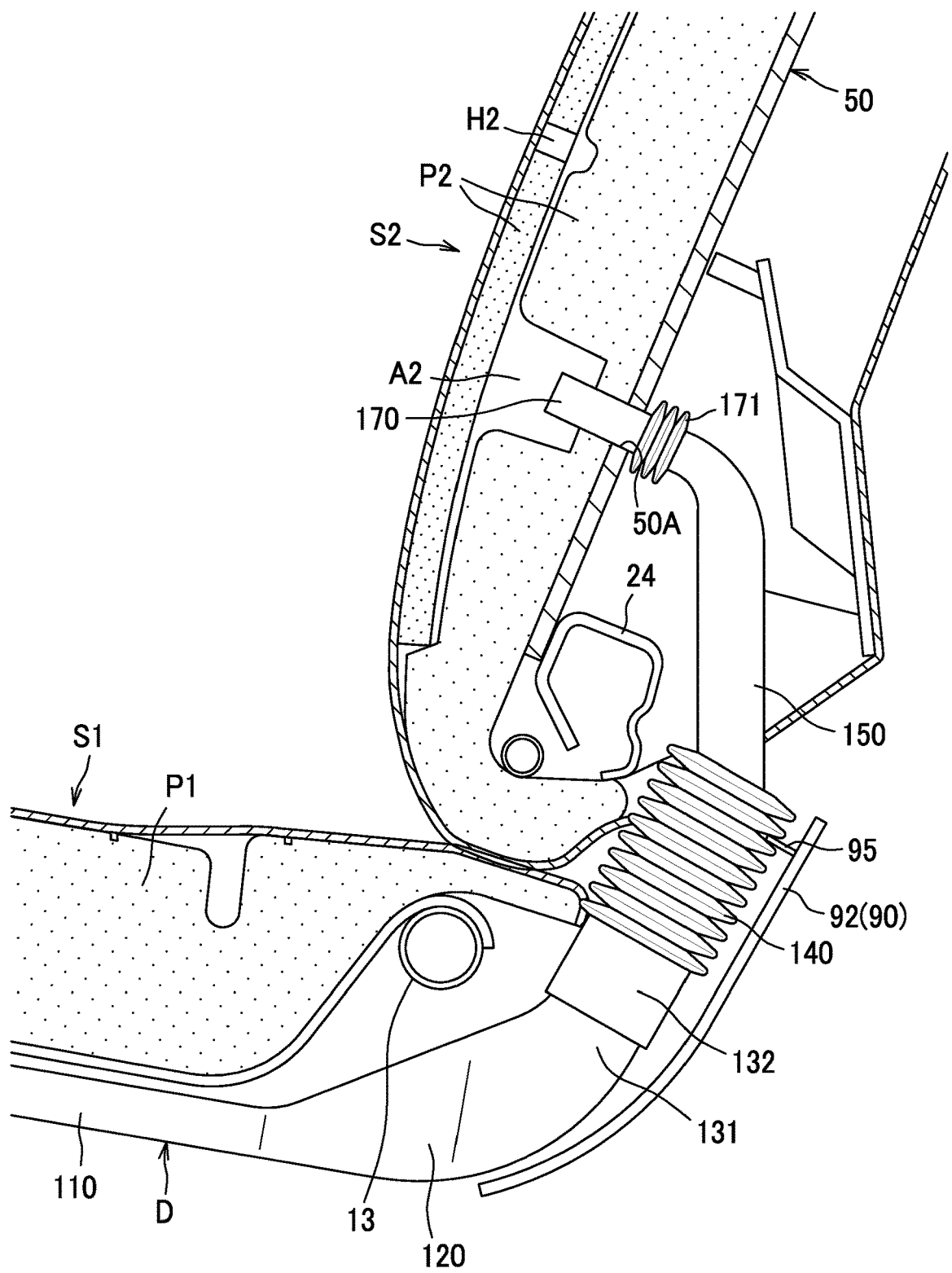
FIG. 17 is a view showing a variation of a side frame cover.

For example, as shown in FIG. 17, the side frame cover 90 may be configured such that a duct cover portion 92 includes a rib-shaped protruding portion 95 protruding from its inside surface toward the duct D, and the protruding portion 95 is disposed deep and engaged in a pleat or furrow of the bellows portion 140. With this configuration, the engagement of the protruding portion 95 of the duct cover portion 92 with the duct D may restrict the position of the duct D, so that the duct D can be restrained from moving.

As shown in FIG. 17, the opening 50A of the pressure-receiving member 50 may be provided with its marginal portion configured to permit the duct D to be held therein. This configuration allows the duct D to be held by the pressure-receiving member 50, and thus eliminates the necessity for another member to hold the duct D, so that the number of parts for the car seat S can be reduced. In the configuration as shown in FIG. 8 where the opening 50A is located between the pair of extension portions 61 of the wire member 60, if the duct D is held by the pressure-receiving member 50, the duct D can be held at the high-rigidity portion of the pressure-receiving member 50 between the pair of extension portions 61, so that the duct D can be held firmly by the pressure-receiving member 50.

Figure 18:
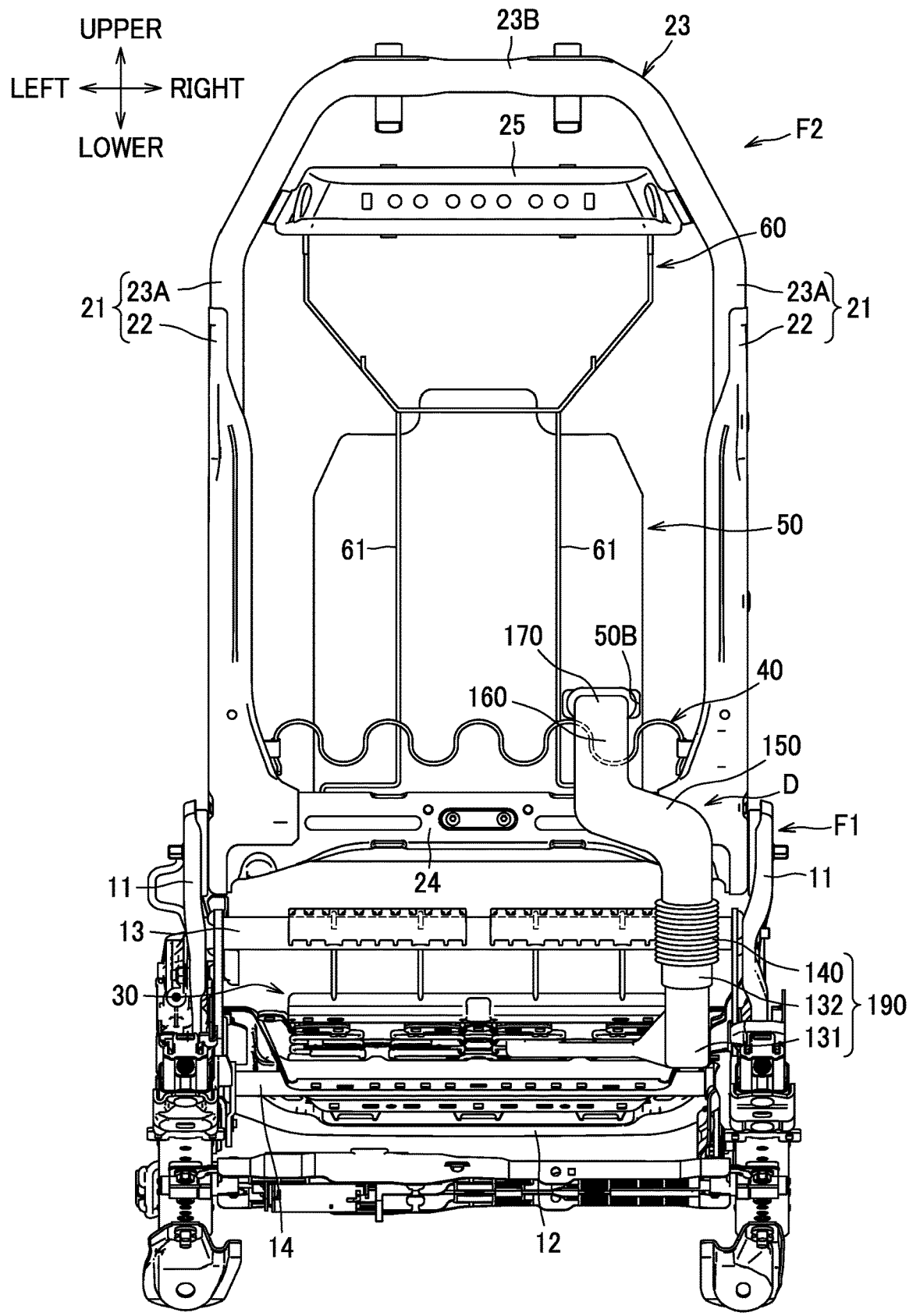
FIG. 18 is a view showing a variation of a pressure-receiving member and a duct.

Although the above-described embodiment is configured such that the opening 50A is located between the pair of extension portions 61, this configuration is not a prerequisite; for example, the opening may be located at an outer side of the extension portions 61 in the lateral direction (i.e., in a direction perpendicular to the predetermined direction). One example as shown in FIG. 18 is such that an opening 50B for the duct to be inserted therein is located at a laterally outer side of the extension portions 61, specifically, at the right side of the right extension portion 61. Since the portion of the pressure-receiving member 50 at the laterally outer side of the extension portions 61 is more likely to deform than the portion between the pair of extension portions 61, location of the opening 50B at the portion more likely to deform makes it easy to connect the duct D to the opening 50B. It is to be understood that the opening 50B may be located at the left side of the left extension portion 61.

Although the above-described embodiment is configured such that the pressure-receiving member 50 is connected to the back frame F2 by a single wire member 60, this configuration is not a prerequisite; rather, two wire members may be used to connect the pressure-receiving member 50 to the back frame F2. Although the above-described embodiment is configured such that a single wire member 60 provided therein includes a pair of extension portions 61, an alternative configuration may be such that two wire members provided therein to connect the pressure-receiving member 50 to the back frame F2 and each wire member includes one extension portion.

Although the above-described embodiment is configured such that the pressure-receiving member 50 is not actuated, this configuration is not a prerequisite; for example, another configuration is feasible such that the pressure-receiving member 50 is caused to move frontward and rearward, and/or arch frontward, thereby changing the shape of its portion with which the lumbar region of an occupant is contactable, so that the conditions of lumbar support for the occupant can be adjusted. In this example, a pressure-receiving member driving device such as an actuator for actuating the pressure-receiving member 50 may preferably be disposed, referring to FIG. 8 for explanatory purposes, at one of the pair of back side frames 21, specifically, at the left back side frame 21. Since the duct D is disposed in a position not closer to the left back side frame (one of the pair of back side frames) but rather closer to the right back side frame (another of the pair of back side frames), interference between the duct D and the pressure-receiving member driving device or other parts associated therewith such as electric wires extending from the pressure-receiving member driving device can be restrained. The pressure-receiving member driving device may preferably be disposed at a laterally inner side of the pair of side frames. With this configuration, the car seat can be made compact in the lateral direction.

Alternatively, if the pressure-receiving member driving device is disposed at the right back side frame 21 or the right cushion side frame 11 and its position in the lateral direction overlaps that of the duct D, the pressure-receiving member driving device may preferably be disposed in a position in the front-rear direction or in the vertical position different from that of the duct D. For example, it is preferable that the pressure-receiving member driving device be located in front, and the duct D be located in rear. With this arrangement, interference between the duct D and the pressure-receiving member driving device can be restrained. An alternative arrangement in which the duct is disposed under the pressure-receiving member driving device in the seat cushion and the duct is disposed at the rear side of the pressure-receiving member driving device in the seat back may restrain interference between the duct and the pad. In cases where the pressure-receiving member 50 is configured to be moved frontward and rearward, a bellows portion 171 configured to be expandable and contractible may preferably be provided in a rear end portion of the back-connecting portion 170, as shown in FIG. 17. With this feature, the duct D can be restrained from getting disengaged form the back pad P2 when the pressure-receiving member 50 moves. It is to be understood that the pressure-receiving member driving device is not limited to the actuator, but may be, for example, a control unit that controls the actuator.

Although the side frame cover 90 in the above-described embodiment is configured to cover part (rear end portion) of the cushion side frame 11, this configuration is not a prerequisite; for example, the side frame cover 90 may be configured to cover the whole cushion side frame 11. Alternatively, for example, the duct cover portion 92 may be configured to cover the bellows portion 140 as a flexible portion, only partially or in entirety.

Although the pan frame 12 as a pad supporting member in the above-described embodiment is, as shown in FIG. 4, so located as to overlap all of the air passages 261-263, this is not a prerequisite. For example, referring to FIG. 4 for explanatory purposes, the pan frame 12 may be so located as to overlap the whole second air passage 262 and front portions of the first and third air passages 261, 263 as viewed from above. In other words, the pad supporting member may be so located as to overlap at least part of the first, second and third air passages. The pad supporting member may not be limited to such a plate-shaped member as the pan frame 12, but may be a member made of a pipe material, or the like.

Although the above-described embodiment is configured such that the first holes 271 and the second holes 272, provided as the first ventilation holes, are formed respectively in a plurality of positions in the cushion pad P1, this configuration is not a prerequisite; for example, an alternative configuration may be such that a plurality of first holes are formed while only one second hole is formed therein, and vice versa. In other words, at least one first hole and at least one second hole formed respectively may be sufficient. Although the second ventilation hole 250 of the cushion pad P1 in the above-described embodiment is located at a position shifted to the right from the laterally central position, but this is not a prerequisite; for example, the second ventilation hole 250 may be located at a position shifted to the left from the laterally central position, or may be located at the laterally central position. Although the above-described embodiment is configured such that two flow passages each consisting of the air passages 261-263 are formed, but this configuration is not a prerequisite; three flow passages may be formed, or one flow passage may be formed, instead.

Although the above-described embodiment is configured such that the branch passage 368 has one end that is closed, this is not a prerequisite; an alternative configuration with one end that is not closed may also be feasible. The fifth holes 375 (first ventilation hole) connected to the first air passages may be provided at a plurality of positions for each first air passage.

Although the cushion pad P1 and the back pad P2 in the above-described embodiment is configured to include a plurality of members, this is not a prerequisite; for example, each pad may be composed of a single member.

Although the duct D in the above-described embodiment includes the bellows portion 140 as a flexible portion, this is not a prerequisite; the flexible portion may be configured in any construction without limitation as long as it has a flexibility.

Although the above-described embodiment is illustrated such that the supporting member includes a plurality of wire members 31 and plastic members 32 connecting the wire members 31, this is not a prerequisite. For example, the supporting member may be configured such that the plurality of wire members are covered approximately in entirety with the plastic member (plastic) and connected thereby. The supporting member may be composed only of wire members such as S springs.

Although the blower 70 in the above-described embodiment is illustrated as a sirocco fan by way of example, this is not a prerequisite; for example, a propeller fan or a turbofan may be applicable, instead. Although the car seat S in the above-described embodiment is configured such that air is blown out through the first ventilation holes H1, H2, this is not a prerequisite; for example, an alternative configuration may be feasible in which air is drawn in through the first ventilation holes. The blower may be configured to be switchable between blow-out and draw-in modes, for example, by changing the direction of rotation of the impeller. Although the above-described embodiment is configured such that the car seat S includes the blower 70, the car seat itself may not include any blower. In other words, the blower may be provided in a car body of an automobile in which the car seat is installed. In this alternative configuration, the car seat may be configured such that the duct is connected, for example, to an outlet or inlet of air provided in the car body.

Although the sensor located under the cushion side frame 11 is illustrated in the above-described embodiment by the weight sensor WS provided to detect the weight of the seat, this is not a prerequisite; for example, a position sensor provided to detect a position of the seat in the front-rear direction may be applied, instead.

The configurations similar to those adopted into the frames and the pad of the seat cushion S1 as explained in relation to the above-described embodiment may be adopted into the seat back, whereas the configurations similar to those adopted into the frames and the pad of the seat back S2 may be adopted into the seat cushion. Although the above-described embodiment is configured such that air passages are formed in both of the seat cushion and the seat back, this configuration is not a prerequisite; an alternative configuration in which such air passages are formed in only one of the seat cushion and the seat back may be feasible.

In the above-described embodiment, the car seat S installed in an automobile is illustrated as a vehicle seat, but this is not a prerequisite; the vehicle seat may be a seat installed in a vehicle other than an automobile, for example, in a railcar, ship, aircraft, etc.

Any of the elements explained in relation to the above-described embodiments and modified examples may be implemented in combination as desired.

The invention claimed is:

1. A vehicle seat with a seat cushion and a seat back, the vehicle seat comprising:
a pair of side frames;
a duct extending from the seat cushion along a rear side of a frame of the seat cushion toward the seat back and connecting an air passage and a blower, the air passage being formed in at least one of the seat cushion and the seat back, the duct including:
a narrower portion located at the rear side of the frame of the seat cushion, wherein a dimension of the narrower portion in a lateral direction is smaller than a dimension thereof in a direction perpendicular to the lateral direction,
a wider portion located under the seat cushion and extending in a front-rear direction, wherein a dimension of the wider portion in the lateral direction is greater than a dimension thereof in a vertical direction, and
a connecting portion connecting the narrower portion and the wider portion,
wherein the connecting portion has a dimension in the lateral direction increasing with increasing a distance from the narrower portion toward the wider portion, and a dimension in the vertical direction decreasing with increasing the distance from the narrower portion toward the wider portion;
a reclining mechanism by which the seat back is supported rotatably relative to the seat cushion; and
a side frame cover comprising:
a side frame cover portion configured to cover at least part of the pair of side frames,
a duct cover portion configured to cover at least part of the duct at the rear side of the frame of the seat cushion, and
a reclining mechanism cover portion configured to cover the reclining mechanism,
wherein the side frame cover portion, the reclining mechanism cover portion, and the duct cover portion are formed integrally in one piece, and
wherein the duct cover portion comprises a rear cover portion extending laterally inward.

2. The vehicle seat according to claim 1, wherein the duct includes a flexible portion having flexibility at the rear side of the frame of the seat cushion, and
wherein the duct cover portion is configured to cover at least part of the flexible portion.

3. The vehicle seat according to claim 1, wherein the duct cover portion includes a protruding portion protruding toward the duct, the protruding portion being engageable with the duct.

4. The vehicle seat according to claim 2, wherein the pair of side frames include a pair of cushion side frames constituting left and right frames of the seat cushion,
wherein the frame of the seat cushion includes, in addition to the pair of the cushion side frames, a rear frame connecting rear portions of the pair of cushion side frames,
wherein the duct includes a bellows portion configured as the flexible portion at a rear side of the rear frame, and
wherein the bellows portion is located above a lower end of the rear frame.

5. The vehicle seat according to claim 1, wherein the pair of side frames include a pair of cushion side frames constituting left and right frames of the seat cushion,
wherein the frame of the seat cushion includes, in addition to the pair of the cushion side frames, a front frame connecting front portions of the pair of cushion side frames, and a rear frame connecting rear portions of the pair of cushion side frames,
wherein the vehicle seat further comprises a wire member laid to connect the front frame and the rear frame, wherein the wire member includes a hook portion hooked on the rear frame, and
wherein a portion of the duct extending at a rear side of the rear frame is located at a position different from a position of the hook portion in the lateral direction.

6. The vehicle seat according to claim 1, comprising a sensor located under one of the pair of side frames,
wherein the duct is, in the lateral direction, located closer to another of the pair of side frames than to the one of the pair of side frames.

7. The vehicle seat according to claim 1, wherein the duct includes a retreated portion located, at the rear side of the frame of the seat cushion, in a position laterally inward of the pair of side frames and closer to one side frame of the pair of side frames than to a laterally central position between the pair of side frames.

8. The vehicle seat according to claim 7, wherein the retreated portion extends obliquely in a downward-and-frontward direction.

9. The vehicle seat according to claim 7, wherein the pair of side frames include a pair of cushion side frames constituting left and right frames of the seat cushion,
wherein the vehicle seat further comprises a supporting member located between the pair of cushion side frames to receive a load from an occupant, and
wherein the duct includes a lower inclined portion located under the supporting member, the lower inclined portion extending obliquely in a rearward-and-downward direction.

10. The vehicle seat according to claim 7, comprising a supporting member located between the pair of side frames to receive a load from an occupant,
wherein the duct includes a portion located at a side opposite to an occupant side of the supporting member,
wherein the supporting member includes a plurality of wire members arranged in rows and a plastic member connecting the wire members, and
wherein the plastic member is located to overlap the duct as viewed from the occupant side.

11. The vehicle seat according to claim 7, wherein the duct includes a lower tubular portion located under the seat cushion,
the lower tubular portion comprising:
a first portion extending in a front-rear direction, the first portion having a front end connected to the blower;
a second portion extending from a rear end of the first portion obliquely in a laterally- outward-and-rearward direction;
a third portion extending from a rear end of the second portion rearward; and
a branch tubular portion extending from the third portion upward and connected to the air passage formed in the seat cushion.

12. The vehicle seat according to claim 11, wherein the lower tubular portion comprises:
a fourth portion extending from a rear end of the third portion obliquely in a laterally- outward-and-rearward direction; and
a fifth portion extending from a rear end of the fourth portion rearward.

13. The vehicle seat according to claim 1, wherein the pair of side frames include a pair of cushion side frames constituting left and right frames of the seat cushion,
wherein the vehicle seat further comprises a supporting member located between the pair of cushion side frames to receive a load from an occupant, and wherein the wider portion is located under the supporting member, in a position closer to the one side frame of the pair of side frames than to a laterally central position between the pair of side frames.

14. The vehicle seat according to claim 1, wherein the retreated portion includes the narrower portion.

15. The vehicle seat according to claim 1, comprising:
a plate-shaped pressure-receiving member configured to receive a load from an occupant; and
a pad member configured to cover an occupant side of the pressure-receiving member,
wherein the air passage is formed in the pad member,
wherein the duct is connected to the air passage from a side opposite to an occupant side of the pad member, and
wherein the pressure-receiving member has an opening through which the duct is disposed.

16. The vehicle seat according to claim 15, comprising a connecting frame connecting the pair of side frames,
wherein the duct includes a first flat portion which is located at a side opposite to an occupant side of the connecting frame, and of which a dimension in an opposed direction in which the first flat portion is opposed to the connecting frame is smaller than a dimension in a direction perpendicular to the opposed direction.

17. A method of assembly of a vehicle seat with a seat cushion and a seat back, the method comprising:
connecting a duct extending from the seat cushion along a rear side of a frame of the seat cushion toward the seat back, to a blower and to an air passage formed in at least one of the seat cushion and the seat back, the duct including:
a narrower portion which is located at the rear side of the frame of the seat cushion and of which a dimension in a lateral direction is smaller than a dimension in a direction perpendicular to the lateral direction,
a wider portion which is located under the seat cushion and extends in a front-rear direction and of which a dimension in the lateral direction is greater than a dimension in a vertical direction, and
a connecting portion connecting the narrower portion and the wider portion, the connecting portion having a dimension in the lateral direction increasing with increasing a distance from the narrower portion toward the wider portion, and a dimension in the vertical direction decreasing with increasing the distance from the narrower portion toward the wider portion; and
providing a side frame cover to cover at least portions of a pair of side frames, the side frame cover comprising:
a side frame cover portion configured to cover at least portions of the pair of side frames,
a reclining mechanism cover portion configured to cover a reclining mechanism by which the seat back is supported rotatably relative to the seat cushion, and
a duct cover portion configured to cover at least part of the duct at the rear side of the frame of the seat cushion, the duct cover portion comprising:
a rear cover portion extending laterally inward, and
wherein the side frame cover portion, the reclining mechanism cover portion, and the duct cover portion are formed integrally in one piece.

* * * * *